(12) United States Patent
Kasatani

(10) Patent No.: US 7,978,353 B2
(45) Date of Patent: Jul. 12, 2011

(54) DOCUMENT INPUT AND OUTPUT DEVICE HAVING SECURITY PROTECTION FUNCTION AND DOCUMENT INPUT AND OUTPUT METHOD OF THE DEVICE

(75) Inventor: Kiyoshi Kasatani, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 929 days.

(21) Appl. No.: 11/509,589

(22) Filed: Aug. 25, 2006

(65) Prior Publication Data

US 2007/0046976 A1    Mar. 1, 2007

(30) Foreign Application Priority Data

Aug. 31, 2005  (JP) .................................. 2005-251320

(51) Int. Cl.
*G06F 3/12* (2006.01)

(52) U.S. Cl. ..................... 358/1.14; 358/1.13; 358/1.15; 358/1.16; 358/402; 358/403

(58) Field of Classification Search ........ 358/1.13–1.18, 358/401–405, 434–436
See application file for complete search history.

(56) References Cited

U.S. PATENT DOCUMENTS

| | | | | |
|---|---|---|---|---|
| 6,185,689 | B1 * | 2/2001 | Todd et al. ...................... | 726/25 |
| 7,046,258 | B1 * | 5/2006 | Naito et al. .................... | 345/619 |
| 7,224,477 | B2 * | 5/2007 | Gassho et al. ............... | 358/1.14 |
| 7,487,233 | B2 * | 2/2009 | Iwamoto et al. .............. | 709/223 |
| 2003/0048470 | A1 * | 3/2003 | Garcia .......................... | 358/1.15 |
| 2004/0059645 | A1 * | 3/2004 | Wirth, Jr. ....................... | 705/27 |
| 2005/0012953 | A1 | 1/2005 | Fujishige | |
| 2005/0024674 | A1 | 2/2005 | Fujishige | |
| 2005/0062990 | A1 | 3/2005 | Fujishige | |
| 2005/0062991 | A1 | 3/2005 | Fujishige | |
| 2005/0066274 | A1 | 3/2005 | Fujishige | |
| 2005/0091325 | A1 | 4/2005 | Kuwana | |
| 2005/0097020 | A1 | 5/2005 | Nomura | |
| 2005/0108549 | A1 | 5/2005 | Kanai | |
| 2005/0188226 | A1 | 8/2005 | Kasatani | |
| 2005/0195446 | A1 | 9/2005 | Kasatani | |
| 2005/0210031 | A1 | 9/2005 | Kasatani | |

(Continued)

FOREIGN PATENT DOCUMENTS

JP        02-200058        8/1990

(Continued)

OTHER PUBLICATIONS

Office Action for corresponding Japanese Patent Application No. 2005-251320 issued Mar. 9, 2010.

(Continued)

*Primary Examiner* — Chan S Park
(74) *Attorney, Agent, or Firm* — Harness, Dickey & Pierce, P.L.C.

(57) ABSTRACT

A document input and output device with a security protection function, the document input and output device being connected to a network and using a plurality of communication protocols, the document input and output device communicating documents in various data forms with plural information devices, includes a protection part configured to provide security protection for the document that is input; a confirmation part configured to encourage reconfirmation of information that is input by a user; and a restriction part configured to limit use of functions of the document input and output device. The document is protected and a document input and output process is performed.

18 Claims, 21 Drawing Sheets

U.S. PATENT DOCUMENTS

| | | |
|---|---|---|
| 2005/0219640 A1 | 10/2005 | Kasatani |
| 2006/0026434 A1* | 2/2006 | Yoshida et al. ............... 713/182 |
| 2006/0253536 A1 | 11/2006 | Fujiwara et al. |

FOREIGN PATENT DOCUMENTS

| | | |
|---|---|---|
| JP | 2002-366473 | 12/2002 |
| JP | 2004-289302 | 10/2004 |
| JP | 2004-304292 | 10/2004 |
| JP | 2004-356822 | 12/2004 |
| JP | 2005-025390 | 1/2005 |
| JP | 2005-025541 | 1/2005 |
| JP | 2005-025544 | 1/2005 |
| JP | 2005-027067 | 1/2005 |
| JP | 2005-031959 | 2/2005 |
| JP | 2005-031961 | 2/2005 |
| JP | 2005-049972 | 2/2005 |
| JP | 2005-049985 | 2/2005 |
| JP | 2005-051377 | 2/2005 |
| JP | 2005-085069 | 3/2005 |
| JP | 2005-085144 | 3/2005 |
| JP | 2005-117350 | 4/2005 |
| JP | 2005-138315 | 6/2005 |
| JP | 2005-149088 | 6/2005 |

OTHER PUBLICATIONS

Japanese Notice of Rejection dated Mar. 3, 2011 issued in corresponding Japanese Application No. 2005-251320.

* cited by examiner

FIG.7

MANAGER SETTING INFORMATION

<MANAGEMENT SETTING TABLE>
(1) EXTERNAL DEVICE IDENTIFICATION: YES
(2) PRIORITY IDENTIFICATION SETTING: FIRST = FIRST EXTERNAL DEVICE, SECOND = INDIVIDUAL MENU DEVICE
(3) FIRST EXTERNAL DEVICE IDENTIFICATION: YES
(4) FIRST EXTERNAL DEVICE IDENTIFICATION SETTING: TYPE = WINDOWS (REGISTERED TRADEMARK) SERVER, DOMAIN NAME = YES, IP ADDRESS = YES
(5) SECOND EXTERNAL DEVICE IDENTIFICATION: YES
(6) SECOND EXTERNAL DEVICE IDENTIFICATION SETTING: TYPE = MULTI FUNCTION PROCESSING MACHINE, DOMAIN NAME = NO, IP ADDRESS = NO
(7) AUTOMATIC REGISTRATION IN INDIVIDUAL MENU
(8) INDIVIDUAL MENU PASSWORD IS AUTOMATICALLY RENEWED
(9) LOG-IN BY ONLY INDIVIDUAL MENU IDENTIFICATION WHEN EXTERNAL SERVER CONNECTION HAS FAILED: YES
(10) INDIVIDUAL MENU AUTOMATIC DELETION SETTING: AUTOMATIC DELETION=YES, STORING TIME = 7 DAYS, WARNING INDICATION = YES
(11) INITIAL VALUE USER OF INDIVIDUAL REGISTRATION SETTING INFORMATION

FIG.8

INDIVIDUAL SETTING INFORMATION

<INDIVIDUAL SETTING TABLE>
(1) KANA WRITING: RICOH TARO
(2) NAME: RICOH TARO
(3) BELONGING TO: DEVELOPING BUSINESS PART
(4) INDIVIDUAL MENU IDENTIFICATION INFORMATION
(5) FIRST EXTERAL DEVICE IDENTIFICATION INFORMATION
(6) SECOND EXTERAL DEVICE IDENTIFICATION INFORMATION
(7) INDIVIDUAL MENU AUTOMATIC DELETION: PERMIT
(8) INDIVIDUAL MENU AUTOMATIC DELETION SETTING STORING AREA:
    AUTOMATIC DELETION = YES, STORING DAYS: 3 DAYS
(9) FUNCTION LIMITATION INFORMATION
(10) REGISTRATION ADDRESS INFORMATION: NAME = HOME DIRECTLY, NETWORK PASS = YES
(11) COMMON MEDIA INFORMATION: NAME = HOME DIRECTLY, REGISTRATION ADDRESS = HOME DIRECTLY
(12) NEWEST USING STATE STORING AREA

SENDING OPTION

| HYSTERESIS/ STATUS DISPLAY |
|---|

| CANCEL | OK |
|---|---|

SET SENDING OPTION AND PRESS "OK"

* THIS IS A SETTING COMMON FOR E-MAIL SENDING AND FAX SENDING. OCR IMPLEMENTING IS AN OBJECT OF A FILE WITHOUT A TEXT.

■ FILE FORMAT

| NO CHANGE | IMAGE FILE | IMAGE PDF |
|---|---|---|

■ IMAGE PDF

| | | |
|---|---|---|
| OCR IMPLEMENTING (IMAGE PDF + FOR OCR) | YES | NO | CHANGE |
| PASSWORD/ SETTING AUTHORITY | YES | | CHANGE |
| EFFECTIVE TERM SETTING | YES | NO | CHANGE |
| EFFECTIVE URL SETTING | YES | NO | CHANGE |

■ FAX RECEIVING 4 CASES    CHANGE

LIMITATION OF FAX SENDING NUMBER

DESIGNATE OPPONENT AND PRESS "OK"
IF "CANCEL" IS PRESSED, THE SCREEN RETURNS WITHOUT CHANGING VALUE

| | | | | CANCEL | OK | CLOSE |
|---|---|---|---|---|---|---|
| OPPONENT 01 | 0312345678 | | PERMIT | NOT PERMIT | | |
| OPPONENT 02 | 04512123434 | | PERMIT | NOT PERMIT | | |
| OPPONENT 03 | 01205556666 | | PERMIT | NOT PERMIT | | |
| OPPONENT 04 | 01207777777 | | PERMIT | NOT PERMIT | | |
| OPPONENT 05 | *NON-REGISTRATION | | | | | |
| OPPONENT 06 | *NON-REGISTRATION | | | | | |
| OPPONENT 07 | *NON-REGISTRATION | | | | | |
| OPPONENT 08 | *NON-REGISTRATION | | | | | |
| OPPONENT 09 | *NON-REGISTRATION | | | | | |
| OPPONENT 10 | *NON-REGISTRATION | | | | | |

1/2  ▼NEXT

FIG.17

SMTP/POP ACCESS LIMITATION | CANCEL | SETTING

DESIGNATE OPPONENT AND PRESS "OK"
IF "CANCEL" IS PRESSED, THE SCREEN RETURNS WITHOUT CHANGING VALUE

| | | | | CANCEL | OK |
|---|---|---|---|---|---|
| OPPONENT 01 | 192..168..0..14 | PERMIT | NOT PERMIT | | |
| OPPONENT 02 | 111..222.333..444 | PERMIT | NOT PERMIT | | |
| OPPONENT 03 | 444.999.999.0 | PERMIT | NOT PERMIT | | |
| OPPONENT 04 | 01207777777 | | | | |
| OPPONENT 05 | *NON-REGISTRATION | | | | |
| OPPONENT 06 | *NON-REGISTRATION | | | | |
| OPPONENT 07 | *NON-REGISTRATION | | | | |
| OPPONENT 08 | *NON-REGISTRATION | | | | |
| OPPONENT 09 | *NON-REGISTRATION | | | | |
| OPPONENT 10 | *NON-REGISTRATION | | | | |

1/2  ▼NEXT

FIG.18

HTTP ACCESS LIMITATION

CANCEL     SETTING

DESIGNATE OPPONENT AND PRESS "OK"
IF "CANCEL" IS PRESSED, THE SCREEN RETURNS WITHOUT CHANGING VALUE

CANCEL     OK

| | | | |
|---|---|---|---|
| OPPONENT 01 | 123.456..789.0 | PERMIT | NOT PERMIT |
| OPPONENT 02 | 111..333..444.888 | PERMIT | NOT PERMIT |
| OPPONENT 03 | 123..789.0..989 | PERMIT | NOT PERMIT |
| OPPONENT 04 | *NON-REGISTRATION | | |
| OPPONENT 05 | *NON-REGISTRATION | | |
| OPPONENT 06 | *NON-REGISTRATION | | |
| OPPONENT 07 | *NON-REGISTRATION | | |
| OPPONENT 08 | *NON-REGISTRATION | | |
| OPPONENT 09 | *NON-REGISTRATION | | |
| OPPONENT 10 | *NON-REGISTRATION | | |

1/2   ▼NEXT

FIG.19

MANAGER SETTING  CANCEL  SET

PLEASE SELECT ITEM TO BE SET

[STORING DOCUMENT MANAGEMENT] [HYSTERESIS MANAGEMENT] [SECURITY]

- ■ MANAGER SETTING PASSWORD  [CHANGE]
- ■ REMOTE SETTING TOOL PASSWORD  [CHANGE]
- ■ SMTP/POP ACCESS LIMITATION  YES  NO
- ■ HTTP ACCESS LIMITATION  YES  NO
- ■ FAX SENDING NUMBER LIMITATION  YES  NO
- ■ INDIVIDUAL MENU IDENTIFICATION SETTING  [CHANGE]
- ■ GUEST MENU LIMITATION  [CHANGE]

1/2  ▼NEXT

DOCUMENT INPUT AND OUTPUT DEVICE HAVING SECURITY PROTECTION FUNCTION AND DOCUMENT INPUT AND OUTPUT METHOD OF THE DEVICE

BACKGROUND OF THE INVENTION

1. Field of the Invention

The present invention relates to document input and output devices having security protection functions and document input and output methods of the devices, and more particularly, a document input and output device having a security protection function, the document input and output device being connected to a network and using plural communication protocols, the document input and output device communicating documents in various data forms to and from plural information devices, and a document input and output method of the device.

2. Description of the Related Art

Recently and continuingly, a network communication system having a document input and output device for identifying external devices, the document input and output device being connected to a network and using plural communication protocols, the document input and output device communicating documents in various data forms to and from plural information devices, has been developed.

In such a network communication system, various application services wherein a document input and output device is used as a core are provided. For example, a document image read out or data made by an information device is sent to a designated address by e-mail, sent by a facsimile, or file-transferred to another information device. Information written in a received e-mail or an image in a file attached to the e-mail is recorded and output, sent to a designated facsimile, or file-transferred to the information device. Storing management of the data sent to the device is performed. See Japanese Laid-Open Patent Application Publication No. 2004-356822, for example.

While the document input and output device connected to such a network processes a large number of documents, a process for security protection such as setting a limit of a function (opening function, printing function, editing function) for handling the document is set for every user. In addition, in a case where the document is sent by facsimile or the like, confirmation of an address is performed by only a user. Because of this, since sending is started after a number of the address is input and then a start key is pressed, an error in sending may occur.

SUMMARY OF THE INVENTION

Accordingly, embodiments of the present invention may provide a novel and useful document input and output device having a security protection function and document input and output method of the device.

More specifically, the embodiments of the present invention may provide a document input and output device having security protection functions and a document input and output method of the device, whereby the document is converted to a document where a limitation to a function for handling the document is set, confirmation of the address is encouraged when the document is sent by facsimile or the like, and an address of the document that is input or output via the device is limited, so that the document can be managed and protected.

One aspect of the present invention may be to provide a document input and output device with a security protection function, the document input and output device being connected to a network and using a plurality of communication protocols, the document input and output device communicating documents in various data forms with plural information devices, including: a protection part configured to provide security protection for the document that is input; a confirmation part configured to encourage reconfirmation of information that is input by a user; and a restriction part configured to limit use of functions of the document input and output device; wherein the document is protected and a document input and output process is performed.

It may be also the aspect of the present invention to provide a document input and output device with a security protection function, the document input and output device being connected to a network and using a plurality of communication protocols, the document input and output device communicating documents in various data forms with plural information devices, including protection means configured to provide security protection for the document that is input; confirmation means configured to encourage reconfirmation of information that is input by a user; and restriction means configured to limit use of functions of the document input and output device; wherein the document is protected and a document input and output process is performed.

It may be also the aspect of the present invention to provide a document input and output method of a document input and output device with a security protection function, the document input and output device being connected to a network and using a plurality of communication protocols, the document input and output device communicating documents in various data forms with plural information devices, the method including: a protection step of providing security protection for the document that is input; a confirmation step for encouraging reconfirmation of information that is input by a user; and a restriction step for limiting use of functions of the document input and output device; wherein the document is protected and a document input and output process is performed.

According to the above-mentioned invention, it is possible to provide a document input and output device having security protection functions and a document input and output method of the device, whereby the document that is input is converted to a document where a limitation to a function for handling the document is set by a protection part, an operational error when the document is sent by facsimile or the like is prevented by a confirmation part, and an address of the document that is input or output via the device is limited by a control part, so that the document can be managed and protected.

Other objects, features, and advantages of the present invention will become more apparent from the following detailed description when read in conjunction with the accompanying drawings.

BRIEF DESCRIPTION OF THE DRAWINGS

FIG. 7 is a view showing a management setting table of setting information for a manager;

FIG. 8 is a view showing an individual setting table of individual setting information;

FIG. 10 is a view of a setting screen of a sending option displayed on a displaying device;

FIG. 11 is a view of a manager setting second screen displayed on the displaying device;

FIG. 16 is a view of a facsimile sending number displayed on the displaying device;

FIG. 17 is a view of an SMTP/POP access limitation screen displayed on the displaying device;

FIG. 18 is a view of an HTTP access limitation screen displayed on the displaying device;

FIG. 19 is a view of a manager setting first screen displayed on the displaying device;

DETAILED DESCRIPTION OF THE PREFERRED EMBODIMENTS

A description of the present invention is now given, with reference to FIG. 1 through FIG. 11, including embodiments of the present invention.

The following embodiment of the present invention is an example where the present invention is applied to so-called digital color multifunction processing machine where a copying function, facsimile function, printing function, scanner function, function for providing an input image (a document image read out by the scanner function or an image input by the printing function or the facsimile function), and others, are combined.

Figure 1:
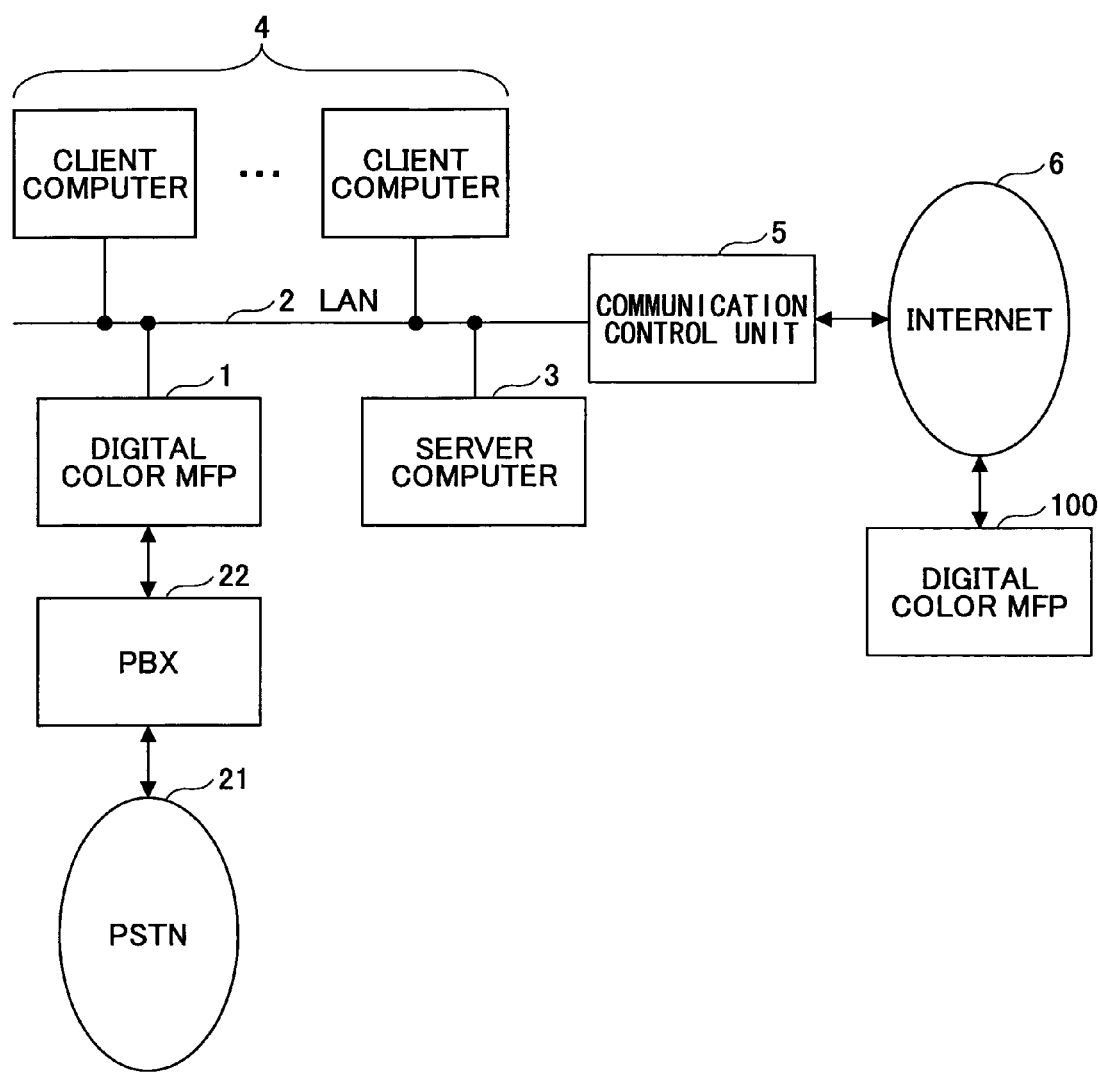
FIG. 1 is a system structural view including a digital color multifunction processing machine of an embodiment of the present invention.

FIG. 1 is a system structural view including a digital color multifunction processing machine of an embodiment of the present invention.

As shown in FIG. 1, in the embodiment of the present invention, a system having the following structure is assumed. A server computer 3 and plural client computers 4 are connected to a digital color multifunction processing machine 1 that is an information processing system via a LAN (Local Area Network) 2 that is a communication network.

The server computer 3 implements various kinds of information processes. For example, the server computer 3 supports FTP or HTTP protocol or realizes a function of a Web server or DNS server (Domain Name Server).

In other words, in this system, an environment where an image processing function of the digital color multifunction processing machine 1 such as an image input function (scanner function), image output function (printing function), image storing function, and others, can be jointly shared on the LAN 2.

Such a system is connected to the Internet 6 via a communication control unit 5 so that data communication between this system and an external environment can be performed via the Internet 6. In addition a digital color multifunction processing machine 100 is provided on the Internet 6. The digital color multifunction processing machine 100 has the same function as the digital color multifunction processing machine 1.

While a router, exchange, modem, DSL modem, or the like is normal as the communication control unit 5, it should be capable of TCP/IP communications as a minimum. In addition, the LAN 2 is not limited to wire communications but may use wireless communication (infrared, electromagnetic wave, or the like). An optical fiber may be used for the LAN 2.

Next, details of the digital color multifunction processing machine 1 are discussed. The explanation of the digital color multifunction processing machine 1 is, of course, applied to the digital color multifunction processing machine 100.

Figure 2:
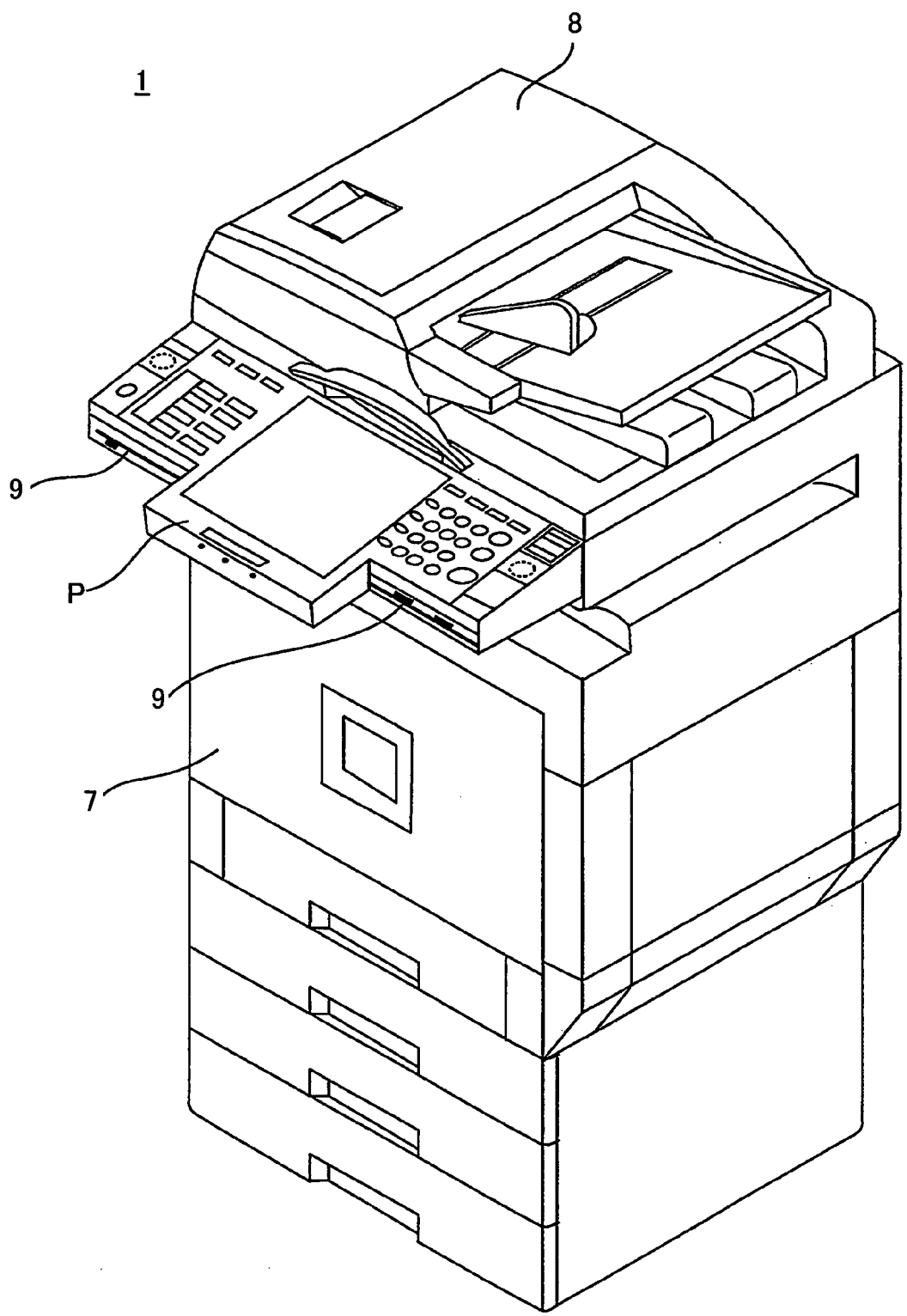
FIG. 2 is a schematic perspective view of the digital color multifunction processing machine.
Figure 3:
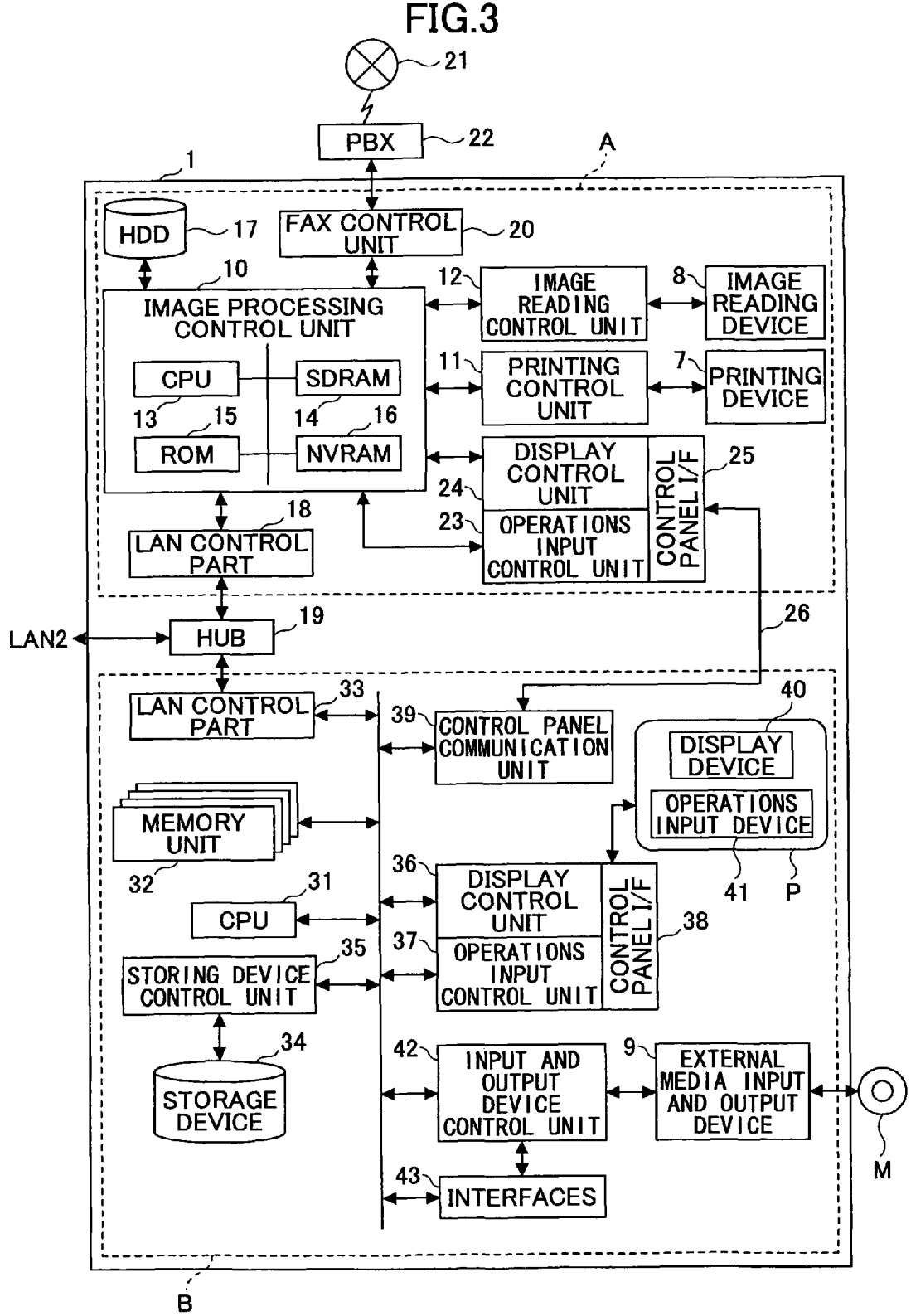
FIG. 3 is a block diagram showing electric connections of parts of the digital color multifunction processing machine.

Here, FIG. 2 is a schematic perspective view of the digital color multifunction processing machine 1. FIG. 3 is a block diagram showing electric connections of parts of the digital color multifunction processing machine 1.

As shown in FIG. 2, in the digital color multifunction processing machine 1, an image reading device 8 is provided at an upper part of a printing device 7. The printing device 7 forms an image on a medium such as a transferring paper. The image reading device 8 reads out the image from a manuscript. An operations panel P is provided at an outside surface of the image reading device 8. The operations panel P displays for an operator and accepts various inputs such as function setting by the operator.

In addition, an external media input and output device 9 is provided at a lower part of the operations panel P so that an inserting opening for receiving a storage medium M (See FIG. 3) is exposed to the outside. The storage medium M is, for example, an optical disk or flexible disk. The external media input and output device 9 reads out program code, image data, or the like stored in the storage medium M and writes the program code, the image data, or the like to the storage medium M.

As shown in FIG. 3, the digital color multifunction processing machine 1 includes an image processing unit part A and an information processing unit part B. A printing device 7 and an image reading device 8 belong to the image processing unit part A. The operations panel P and the external media input and output device 9 belong to the information processing unit part B for performing various information processes.

First, the image processing unit part A is discussed. As shown in FIG. 3, the image processing unit part A having the printing device 7 and the image reading device 8 includes the image processing control unit 10. The image processing control unit 10 implements control of the entire imaging process at the image processing unit part A. A printing control unit 11 and an image reading control unit 12 are connected to the image processing control unit 10. The printing control unit 11 controls the printing device 7. The image reading control unit 12 controls the image reading device 8.

The printing control unit 11 outputs a printing order including the image data to the printing device 7 following the control of the image processing control unit 10. The printing control unit 11 makes the printing device 7 form the image on the transferring paper and output it. Full color printing can be performed by the printing device 7. As a printing method, not only an electrophotographic method but also various types of methods such as an inkjet type, a sublimation thermal transferring type, a silver photographing type, a direct thermal recoding type, or a melting thermal transferring type, can be used.

An image reading control unit 12 drives the image reading device 8 under the control of the image processing control unit 10. The image reading control unit 12 condenses a reflection light of lamp irradiation against the surface of a manuscript onto a light receiving element (for example, CCD (Charge Coupled Device)) by a mirror or lens so as to read it, and makes A/D conversion so as to generate digital image data of RGB 8 bits.

The image processing control unit 10 has a microcomputer structure where a CPU (Central Processing Unit) 13 being a main processor, an SDRAM (Synchronous Dynamic Random Access Memory) 14, a ROM (Read Only Memory) 15, and an NVRAM (Non Volatile RAM) 16 are connected by a bus. The image data read by the image reading device 8 is stored in the SDRAM 14 for a while for image forming by the printing device 7. A control program or the like is stored in the ROM 15. The NVRAM 16 can store the data even at the time of electric power loss when a system log, system setting or log information is recorded.

In addition, an HDD (magnetic disk device) 17, a LAN control part 18 and a FAX control unit 20 are connected to the image processing control unit 10. The HDD 17 is a storing device for storing a large amount of image data or job history. The LAN control part 18 connected the image processing unit part A to the LAN 2 via a HUB 19 that is a line concentrator of an internal LAN provided inside of the device. The FAX control unit 20 implements facsimile control. The FAX control unit 20 is connected to a PBX (Private Branch exchange) 22 connected to a public switched telephone network 21, so that the digital color multifunction processing machine 1 can make contact with a remote facsimile via the public switched telephone network 21.

In addition, a display control unit 23 and an operations input control unit 24 are connected to the image processing control unit 10.

The display part 23 outputs an image display control signal to the information processing unit part B via a communication cable connected to a control panel I/F (interface) 25 by control of the image processing control unit 10. The display part 23 implements control of the image display of the operations panel P of the information processing unit part B.

The operations input control unit 24 inputs an input control signal via the communication cable 26 connected to the control panel I/F 25 by the control of the image processing control unit 10. The input control signal corresponds to functional settings or input operations by the operator from the operations panel P of the information processing unit part B. In other words, the image processing unit part A directly monitors the operations panel P of the information processing unit part B via the communication cable 26.

Therefore, the image processing unit part A connects the communication cable 26 to an image processing unit which a conventional image processing device has so as to use the operations panel P of the information processing unit part B. In other words, the operations input control unit 24 and the display control unit 23 of the image processing unit part A operate being connected to the operations panel P.

Under this structure, the image processing unit part A analyzes a printing order command and printing data that are image information from the outside such as the server computer 3, the client computer 4, the facsimile, or the like, so as to convert the printing data into bit-map data to be printed as the output image data. The image processing unit part A analyzes the printing data from the command and determines the operation. The image processing unit part A receives the printing data and the command from the LAN control part 18 or the FAX control unit 20 and operates on them.

In addition, the image processing unit part A can transfer the printing data, manuscript reading data, output image data made by processing these data for output, and compressed data made by compressing these data to the outside such as the server computer 3, the client computer 4, the facsimile, or the like.

Furthermore, the image processing unit part A transfers the reading data of the image reading device 8 to the image processing control unit 10, corrects signal degradation due to quantization of an optical system or a digital signal, and writes the image data in the SDRAM 14. Thus, the image data stored in the SDRAM 14 are converted to the output image data by the printing control unit 11 so as to be output to the printing device 7.

Next, the information processing unit part B having the operations panel P is discussed. As shown in FIG. 3, the information processing unit part B has a microcomputer structure where the information processing unit part B is controlled by a generic OS (Operating System) used for an information processing device generally called a personal computer. The information processing unit part B includes a CPU 31 as a main processor. A memory unit 32 and a storing device control unit 35 are connected by a bus to the CPU 31. The memory unit 32 includes a RAM that is a work area of the CPU 31 and a ROM that is exclusively a reading memory where a starting program is stored. The storing device control unit 35 controls input and output of the data to and from the storing device 34 such as an HDD storing a program or the OS.

A LAN control part 33 is connected to the CPU 31. The LAN control part 33 is a communication interface for connecting the information processing unit part B to the LAN 2 via the HUB 19. An IP address that is a network address allocated to the LAN control part 33 is different from the IP address allocated to the LAN control part 18 of the image processing unit part A. In other words, two IP addresses are allocated to the digital color multifunction processing machine 1 of the embodiment of the present invention. The image processing unit part A and the information processing unit part B are respectively connected to the LAN 2. Data conversion between the image processing unit part A and the information processing unit part B can be performed.

Since the digital color multifunction processing machine 1 is connected to the LAN 12 via the HUB 19, only a single IP address is seemingly allocated. Therefore, it is possible to easily handle connections without damaging a fine appearance.

Figure 4:
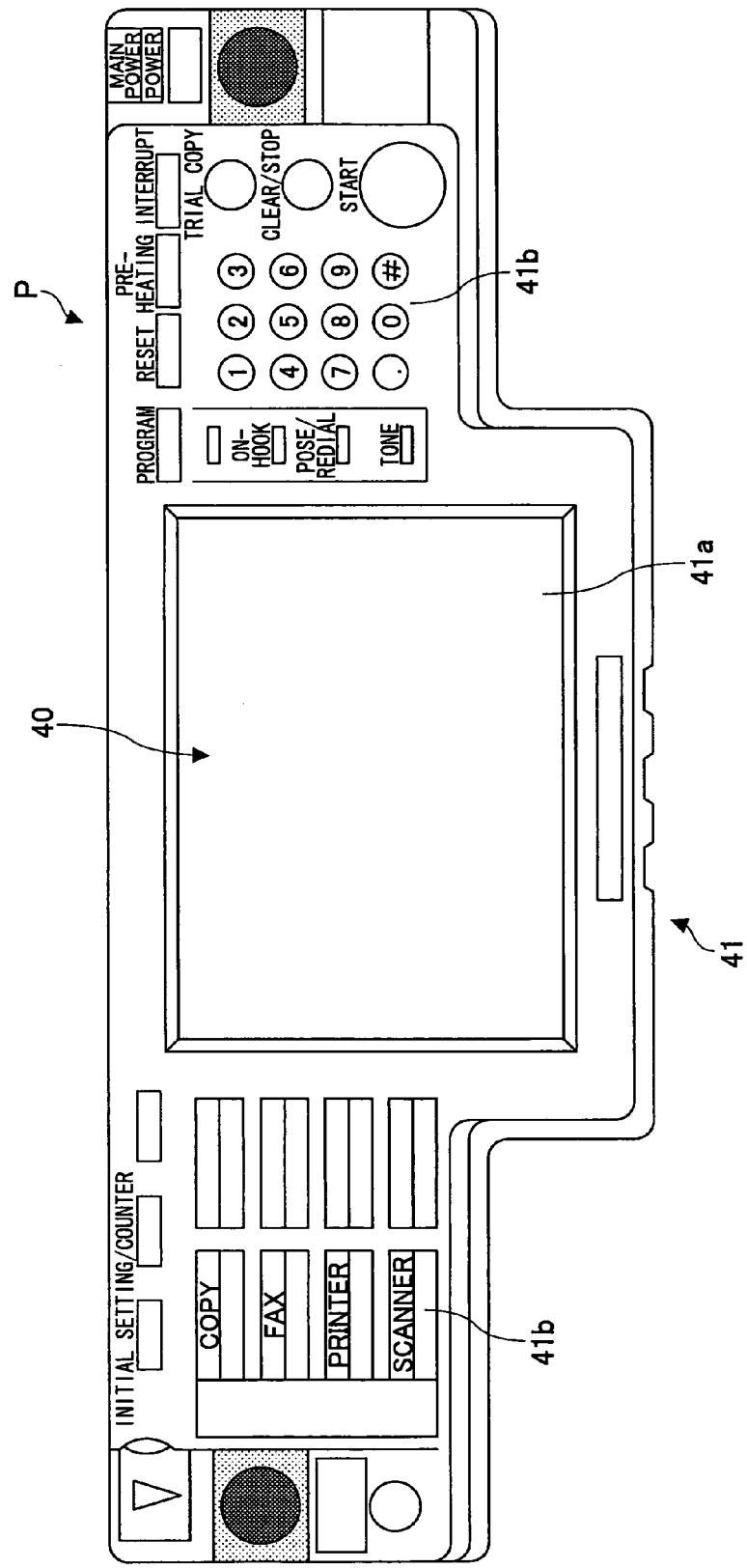
FIG. 4 is a plan view showing a structure of an operations panel.

In addition, a display control unit 36 and an operations input control unit 37 for controlling the operations panel P are connected to the CPU 31. FIG. 4 is a plan view showing a structure of the operations panel P. As shown in FIG. 4, the operations panel P includes a display device 40 and an operations input device 41. The display device 40 is, for example, LCD (Liquid Crystal Display). The operations input device 41 includes a touch panel 41a and a key board 41b. The touch panel 41a is an ultrasonic elastic wave type panel stacked on a surface of the display device 40. The key board 41b has plural keys.

A start key, ten-key, reading condition setting key, clear key, and others are provided on the key board 41b. The start key is used for starting a process such as an image reading process. The ten key is used for input a numerical value. The reading condition setting key is used for setting the address to which the read image data are sent. In other words, the display control unit 36 outputs the image display control signal to the display device 40 via the control panel I/F 38 so as to make the display device 40 display a designated item corresponding to the image display control signal. On the other hand, the operations input control unit 37 receives an input control signal via the control panel I/F 38. This input control signal corresponds to functional settings or input operations by the operator in the operations input device 41.

In addition, a control panel communication unit 39 is connected to the CPU 31. The control panel communication unit 39 is connected to the control panel I/F 25 of the image processing unit part A via the communication cable 26.

The control panel communication unit 39 receives the image display control signal output from the image processing unit part A. The control panel communication unit 39 also transfers the input control signal corresponding to the functional setting or input operations from the operations panel P by the operator, to the image processing unit part A.

As discussed below, the image display control signal from the image processing unit part A received by the control panel communication unit 39 is processed for data conversion for the display device 40 of the operations panel P and then output to the display control unit 36.

In addition, the input control signal corresponding to the functional settings or input operations from the operations panel P by the operator is converted to a format corresponding to a specification of the image processing unit part A and then input to the control panel communication unit 39.

As discussed above, the OS or program implemented by the CPU 31 is stored in the storing device 34. This means that the storing device 34 functions as a storage medium storing the program.

In the digital color multifunction processing machine 1, if the user turns on the electric power, the CPU 31 activates a starting program in the memory unit 32 so that the OS is read from the storage device 34 and written by the RAM in the memory unit 32 so that this OS is activated. Such an OS activates a program corresponding to the operation of the user and reads and stores the information. For example, Windows (Registered Trademark) and others are each known as such an OS. An operating program used for the OS is called an application program. The same type of OS used for the information processing device such as the server computer 3 or the client computer 4, namely a generic OS such as Windows (Registered Trademark) is used as the OS of the information processing unit part B.

As discussed above, the external media input and output device 9 is provided in the digital color multifunction processing machine 1. The external media input and output device 9 is a device for reading the program code or the image data stored in a storage medium M or for storing the program code or the image data in the storage medium M, such as a flexible disk drive device, an optical disk drive device, an MO drive device, or a media drive device. The storing medium M is a medium where various program code sets (control programs) such as various application programs, the device driver, or the OS is stored. The storing medium M is, for example, a flexible disk, a hard disk, an optical disk (CD-ROM, CD-R, CD-RW, DVD-ROM, DVD-RAM, DVD-R, DVD+R, DVD-RW, DVD+RW, and others), or a semiconductor medium (SD memory card (registered trademark), Compact Flash (registered trademark), Memory Stick (registered trademark), Smart Media (registered trademark), or the like). Such an external media input and output device 9 is controlled by an input and output device control unit 42 that is connected by bus to the CPU 31.

Accordingly, the application program stored in the storage device M may be installed in the storage device 34. Because of this, the storage medium M can be the storage medium storing the application program. In addition, the application program may be taken in from the outside via, for example, the Internet or LAN 2 so as to be installed in the storage device 34.

Various interfaces 43 such as USB, IEEE 1394, and SCSI are connected to the input and output device control unit 42. Hence, via the various interfaces 43, various devices such as a digital camera can be connected to the input and output device control unit 42.

Next, a specific process implemented by the digital color multifunction processing machine 1 is discussed. In the digital color multifunction processing machine 1, plural devices implementing different processes from each other, namely the image processing unit part A and the information processing unit part B in this example, can independently perform the processes. Therefore, when the image reading process is implemented by the image processing unit part A, the information processing unit part B can receive e-mail, for example. In this example, since the results of the processes do not affect each other, there is no problem in independent operations of the image processing unit part A and the information processing unit part B.

Furthermore, in the digital color multifunction processing machine 1, each of the functions of the image processing unit part A can be used by the program operated by the information processing unit part B and the result can be a subject of the processing. For example, image data of a document image read by the image reading device 8 of the image processing unit part A is character-recognition processed by a designated application program so that a text document can be obtained.

However, if the image processing unit part A and the information processing unit part B always perform the processes independently from each other, each of the functions of the image processing unit part A cannot be used by the program operated by the information processing unit part B and the result cannot be the subject of the processing. Because of this, in this example, each of the functions of the image processing unit part A cannot be used by operating the application program based on the combination of process modules.

In the image processing unit part A, a module of a control system executed by the image processing control unit 10 is formed by an application program for implementing original functions of a multifunction processing machine by the digital color multifunction processing machine 1. In the digital color multifunction processing machine 1, an interface of a functional module for a network is provided at the LAN control part 18 to which access from only the information processing unit part B via the HUB 19 (LAN 2) can be made.

Based on the functional module for the network, a function provided for a normal multifunction processing machine as a standard and implemented by the image processing control unit 10, such as the scanner function or facsimile function, can be used via the LAN 2. The function cannot be used by the image processing unit part A.

When TCP/IP (Transmission Control Protocol/Internet Protocol) detects a connection requirement for a corresponding port number, a process module of a corresponding function is activated. Here, the TCP/IP always monitors access from the LAN 2.

For example, when the connection of the port number 1002 is requested, a module of a facsimile receiving function is activated. The activated module operates based on the processing requirement from a side requesting the connection so as to reply with a necessary response.

Next, a specific feature of an application program of the information processing unit part B is discussed. A key word generation application is discussed as an example.

The keyword generation application implements the character recognition process for the image data being read so that a keyword is made from the result of the character recognition. In the entirety of the information processing unit part B, each of the application programs is executed under the management of the OS.

In addition, each of the application programs can use the functions provided by the OS. In other word, while the application program is executing the OS is used as a module of the software so that a necessary process is performed. For example, the TCP/IP control module implements a function provided in the OS as a standard, the function being used for communication with other information devices connected by the TCP/IP.

Furthermore, an independent application program installed for use by other application programs can be used. For example, an OCR engine implements only a character recognition process from the image data. Since the OCR engine does not operate individually, the OCR engine is used as a part (module) of other application programs.

Thus, since each of the application programs can be executed under the management of the OS in the entirety of the information processing unit part B, an application program having these functions can be developed.

However, in the conventional technology, the functions of the image processing unit part A and others cannot be directly used by such means.

In other words, as discussed above, in the digital color multifunction processing machine 1, the image processing unit part A for implementing the original function of the multifunction processing machine and the information processing unit part B for implementing the application programs are provided. The image processing unit part A and the information processing unit part B are connected to each other via the LAN 2 by the network protocol (TCP/IP in this example) in the digital color multifunction processing machine 1.

Since the image processing unit part A and the information processing unit part B are physically connected, it is possible to mutually communicate data between the image processing unit part A and the information processing unit part B. However, in the conventional technology, the function of the image processing unit part A cannot be used from inside of the application program executing in the information processing unit part B.

Here, means for using the function of the image processing unit part A from inside of the application program executing in the information processing unit part B are discussed.

For example, in the keyword generation application, the image data are read from the image reading device 8 managed by the image processing unit part A.

In order to instruct the image reading device 8 to perform image reading operations, it is necessary to designate the port number 1001 and request a TCP/IP connection to the image processing unit part A. At this time, data indicating the contents of the process are simultaneously sent as a data stream.

In the function designated by the port number 1001, the image reading device 8 reads the image. An optional file name is added to the image data and the image data are transferred to the information processing unit part B. The contents of such a process are determined in advance. The port number is allocated so that these functions are individually used.

Thus, the functions of the image processing unit part A can be used from the keyword generation application. The communication protocol is not limited to TCP/IP but may be other types of protocols.

The digital color multifunction processing machine 1 of the embodiment of the present invention basically has a scanner function, an image processing function, a media browser function, a document browser function, a page browser function, a form synthesizing function, a sending/storing function, a printing function, an OCR function, a searching function, a facsimile function, a mail server function, a Web server function, a periodic implementation function, a system monitoring function, a security function, a hysteresis/status display function, an individual setting function, a manager setting function, and others. Each of the functions is briefly discussed below.

In the scanner function, the paper document is read out in an image file form so as to be sent or be stored inside as an e-mail, facsimile, or a file (Windows (registered trademark) common folder, FTP folder, Web folder, outside server, or the like).

In the media browser function, files stored in respective media of a recording medium M can be read. The Windows (registered trademark) common folder on the network, FTP, Web folder, or the like is set as a common medium by individual setting so that it can be read by the same operation as that of the recording medium M.

In the document browser function, a group (document) of files such as stored normal documents (including a document stored for a file), received e-mail (including attached files such as images), a received facsimile, or the like can be operated on and read. In addition, the document browser function includes a document management function so that the name of the document can be changed and the document can be deleted. In the stored document, OCR characters in the image can be searched for by the OCR function discussed below and downloads from the Web can be performed.

In the page browser function, the stored document or the image read or selected for sending or printing is confirmed, so that the image in the main body can be displayed. A selection function for file sending, storing, printing, reading or editing of various information items of the file can be performed.

In the image processing function, there is an automatic image processing function whereby an image operation before sending, storing or printing can be performed. It is possible to make image quality corrections, perform rotation, reduce colors, and cut the image to and remove white paper.

In the form synthesizing function, position information (form) with a background where text or an image is provided is selected so that a new image is synthesized before being sent, stored or printed.

In the sending/storing function, an image or a file selected by the paper manuscript (scanner), the media browser, or the document browser (page browser) can be sent by mail or facsimile to a designated opponent, or a file sent to common media or outside server. In addition, as discussed above, because of storing, an OCR-processed character line can be searched for or downloading from the Web.

In the printing function, the image or the file selected by the media browser or the document browser (page browser) can be printed by designating various layouts (forms).

In the OCR function, text of the image obtained by the scanner function or received facsimile image is extracted by character recognition (OCR). The PDF file (image PDF+

OCR) where the text is provided is formed so as to be sent or stored. In the OCR function, there is an all sentences searching function of the stored document, and an OCR address or document name function used for the address or document name from the character line in the file. This OCR address is where an OCR character line of a designated region is consistent with a registered address. The OCR document name is a document name of the OCR character line of the designated region.

In the searching function, a file is extracted from the images or the file stored or existing on the common media (network) by using the document name, the file name, storing day and time, changing day and time, the OCR text (the character line where the OCR image processed is a subject) as a key word so that a file whose contents are consistent is displayed.

In the facsimile function, image information received from a facsimile communication port (such as G3-1, G3-2, G4-1 or the like) prepared by the digital color multifunction processing machine 1 is converted to the image file and the image file is divided and forwarded (e-mail forwarded or facsimile forwarded). The received facsimiles are divided based on senders by the initial setting or addresses by the receiving port. In addition, the image file from the paper document, the media document, or the stored document can be transferred by facsimile or the image attached to the received e-mail can be forwarded to another facsimile device.

In the mail server function, there are a function for sending e-mail, a function for forming and storing e-mail addresses of guests and individuals inside (at the time of SMTP (Simple Mail Transfer Protocol) setting), a function for one-touch operation of automatic printing, facsimile transferring, sending or storing an image attached to the received e-mail, and a function for sending back an operation result e-mail to the sender.

Here, several operation combinations of the received e-mail addresses are prepared for every guest or individual. The setting and change are implemented in the individual setting. In addition, e-mail addresses (at the time of POP (Post Office Protocol) receiving setting) of a single outside e-mail server are divided by the e-mail address indication name so that the same operation as the operation at the time of SMTP setting can be performed.

In order to correspond to various e-mail environments, e-mail sending corresponds to the SMTP identification and "POP before SMTP" mode. E-mail receiving corresponds to APOP (Authenticated Post Office Protocol), too.

In the Web server function, a URL is prepared for the guest and the individual, so that the image or file stored inside can be read, searched, downloaded, uploaded, sent, stored, and printed. In addition, the result of the operation can be referred to and the individual or the manager can be set. Furthermore, this function corresponds to SSL (Secure Socket Layer) sever identification in considering security during the communication.

In the periodic implementation function, deletion of storing data whose storing time passes, receiving the POP e-mail, the renewal of the LDAP (Lightweight Directory Access Protocol), automatic printing or deletion of hysteresis, and auto restarting can be done.

In the system monitoring function, disk full, abnormality generated inside of the machine, tray or door open information or paper jamming is detected so that a screen message urging the user including a service call screen is displayed. In addition, it is possible to correspond to an accounting device monitoring or limiting the use of the user.

In the security function, in order to protect data from illegal operation by an unknown user (guest user) or outside network, security (individual identification function, manager password, or the like) against the user of the operation part and security (e-mail sending identification, APOP, SSL Server identification of Web, access limitation or the like) against the network is provided.

In the hysteresis/status display function, whether the result of receiving, sending and printing of the e-mail, facsimile, or file is normal, the date and time of implementation or completion, and contents of job cancellation or errors can be confirmed.

In the individual setting function, it is possible to register the environment settings for every individual while avoiding a situation where a third party sees the user environment (registration of the address of the e-mail, customized operation and screen, received e-mail address, and others) of the individual user.

In the manager setting function, various setting function against the user, basic operating the functions (network setting, time setting automatic restarting time), and management functions (user management, e-mail environment setting, received facsimile setting) can be implemented.

Figure 5:
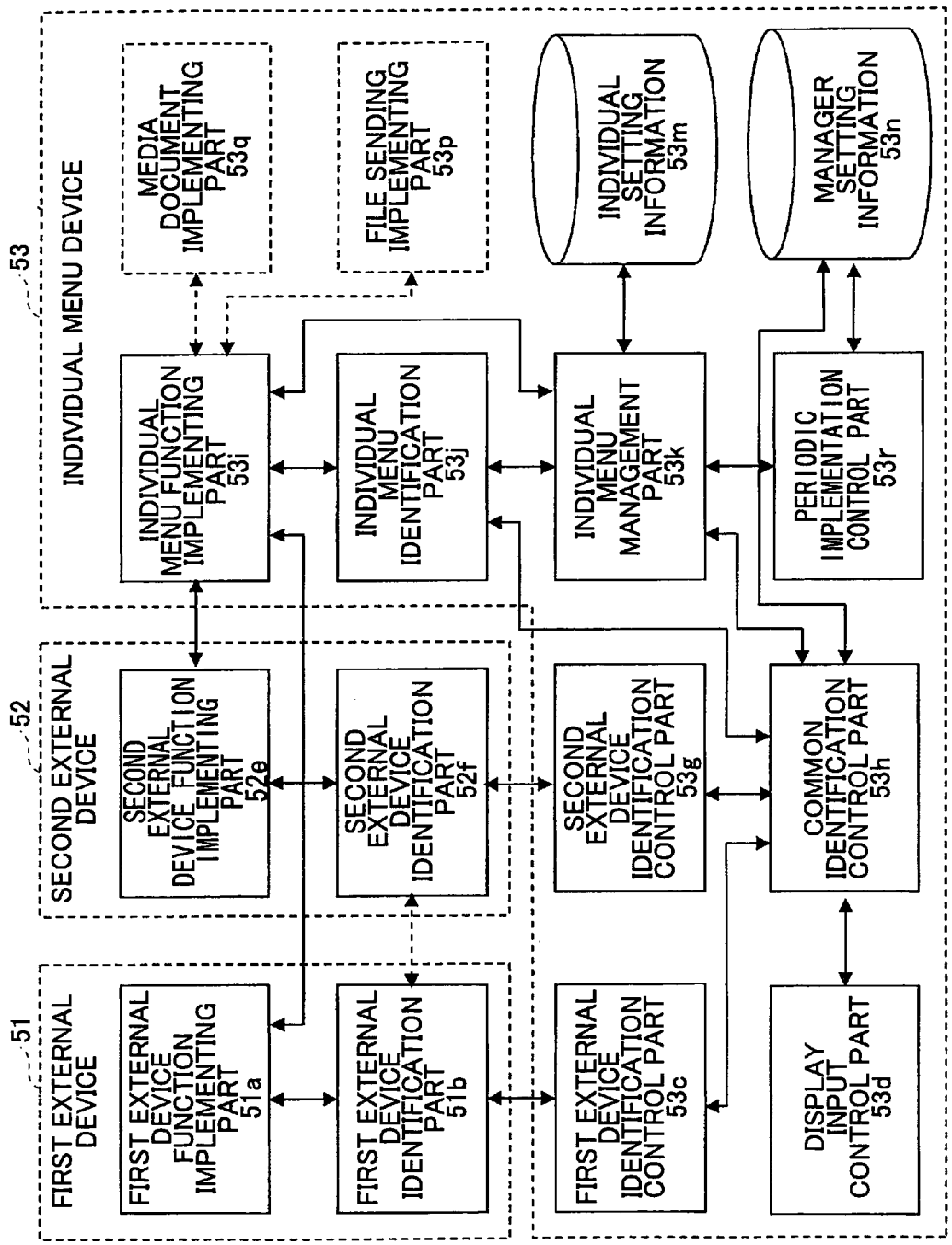
FIG. 5 is a block diagram showing a functional structure for controlling identifying action in the embodiment of the present invention.

FIG. 5 is a block diagram showing a functional structure for controlling identifying action in the embodiment of the present invention. In FIG. 5, arrows connecting blocks represent main flows of signals. This does not limit the function of each of the blocks. In addition, in FIG. 5, a first external device 51 corresponds to the server computer 3 shown in FIG. 1. A second external device 52 corresponds to the image processing unit part A shown in FIG. 3. An individual menu device 53 corresponds to the information processing unit part B shown in FIG. 3.

Figure 6:
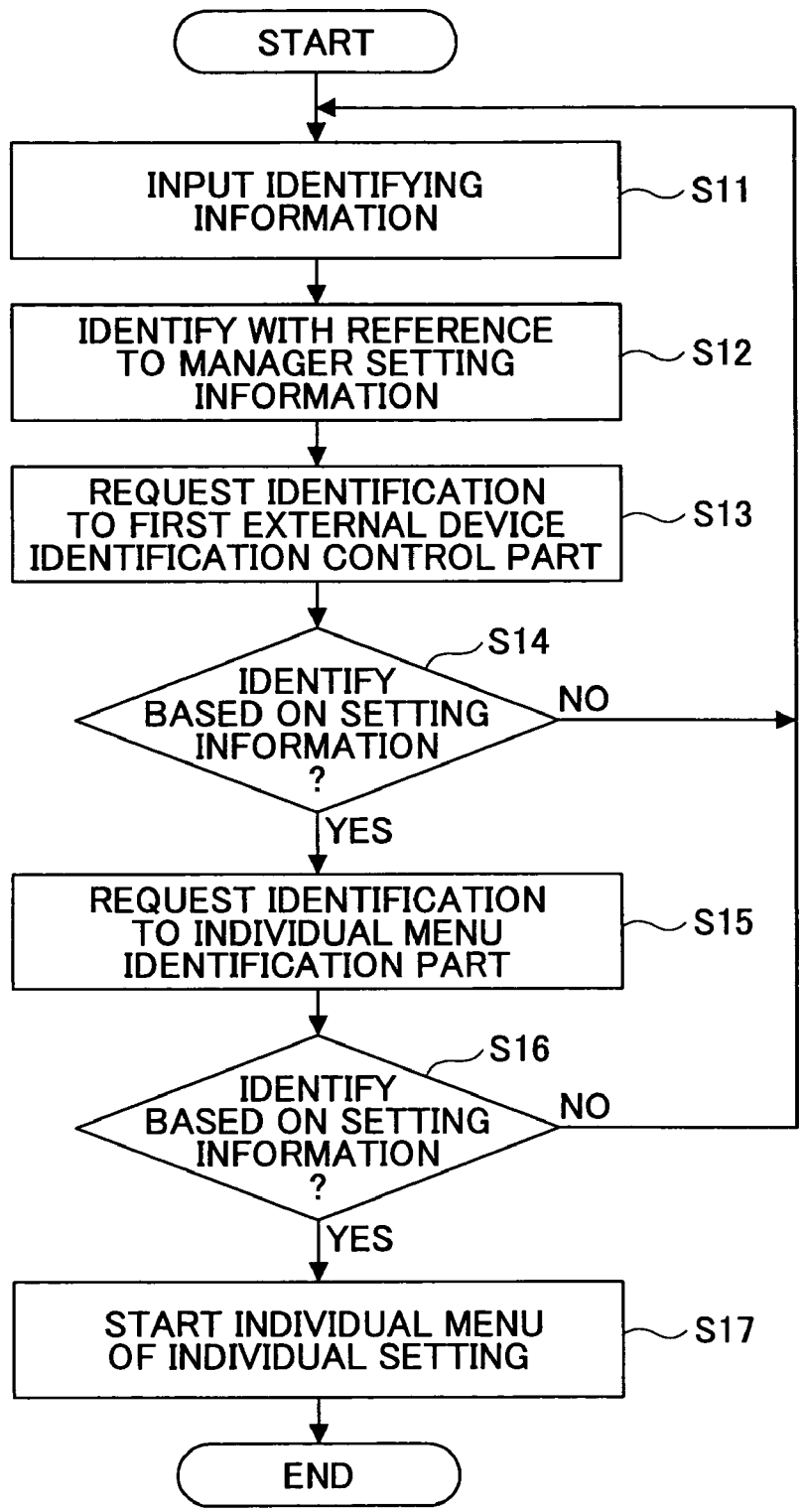
FIG. 6 is a flowchart showing an operation of identifying action of an individual menu device of the digital color multifunction processing machine of the embodiment of the present invention.

FIG. 6 is a flowchart showing an operation of identifying action of an individual menu device of the digital color multifunction processing machine of the embodiment of the present invention.

Based on the flowchart of FIG. 6, the operation in the embodiment of the present invention is discussed with reference to FIG. 5.

As an identifying action in the digital color multifunction processing machine 1 shown in FIG. 6, a display input control part 53d of the individual menu device 53 receives identifying information of the user (user name, password, ID card for identifying, and others) from the main picture displayed at the operations panel P (See FIG. 4), for example in step S11. The identifying information of the user is input from the input picture of the identifying information by pushing the individual identifying key.

The display input control part 53d transfers the input identifying information to a common identification control part 53h. The common identification control part 53h identifies the information following the setting of a manager setting information 53n in step S12. Here, in setting the manager setting information 53n, in a case where the item (1) of a management setting table shown in FIG. 7 is "EXTERNAL DEVICE IDENTIFICATION: YES", the identification is requested in order based on the setting of the item (2) of the management setting table "PRIORITY IDENTIFICATION SETTING: FIRST=FIRST EXTERNAL DEVICE, SECOND=INDIVIDUAL MENU DEVICE" in step S3.

One of "FIRST EXTERNAL DEVICE", "SECOND EXTERNAL DEVICE", and "INDIVIDUAL MENU DEVICE" is set as a first item of priority identification setting. The device which is priority identification set is indicated at the items (3) "FIRST EXTERNAL DEVICE IDENTIFICATION: YES" or (5) "SECOND EXTERNAL DEVICE IDENTIFICATION: YES".

In the case of the item (2) of the management setting table "PRIORITY IDENTIFICATION SETTING: FIRST=FIRST EXTERNAL DEVICE, SECOND=INDIVIDUAL MENU DEVICE", the common identification control part 53h requests, in step S13, the identification of the first external device from a first external device identification control part 53c by the identification information of the user input in step S11. The first external device identification control part 53c, in step S14, determines the identification with a first external device identification part 51b by an existing protocol. If this identification is not successful (NO in step S14), the identification flow of the user goes back to the beginning. If this identification is successful (YES in step S14), the common identification control part 53h request identification of the individual menu to a individual menu identification part 53j in step S5.

The individual menu management 53k determines, with reference to the individual setting information 53m, the requested identification in step S16. If the identification is successful (YES in step S16), the individual menu identification part 53j requests the individual menu function implementing part 53i to start the individual menu. If this identification is not successful (NO in step S16), the identification flow of the user goes back to the beginning.

The individual menu function implementing part 53i obtains the individual setting information 53m via the individual menu management part 53k so as to start the individual menu at the individual setting in step S17. Thus, the identification flow to the individual menu device 53 is implemented as discussed above. At this time, since the identification of the first external device identification part 51b is successful, the function of a first external device function implementing part 51a can be used from the individual menu of the individual menu function implementing part 53i.

Figure 9:
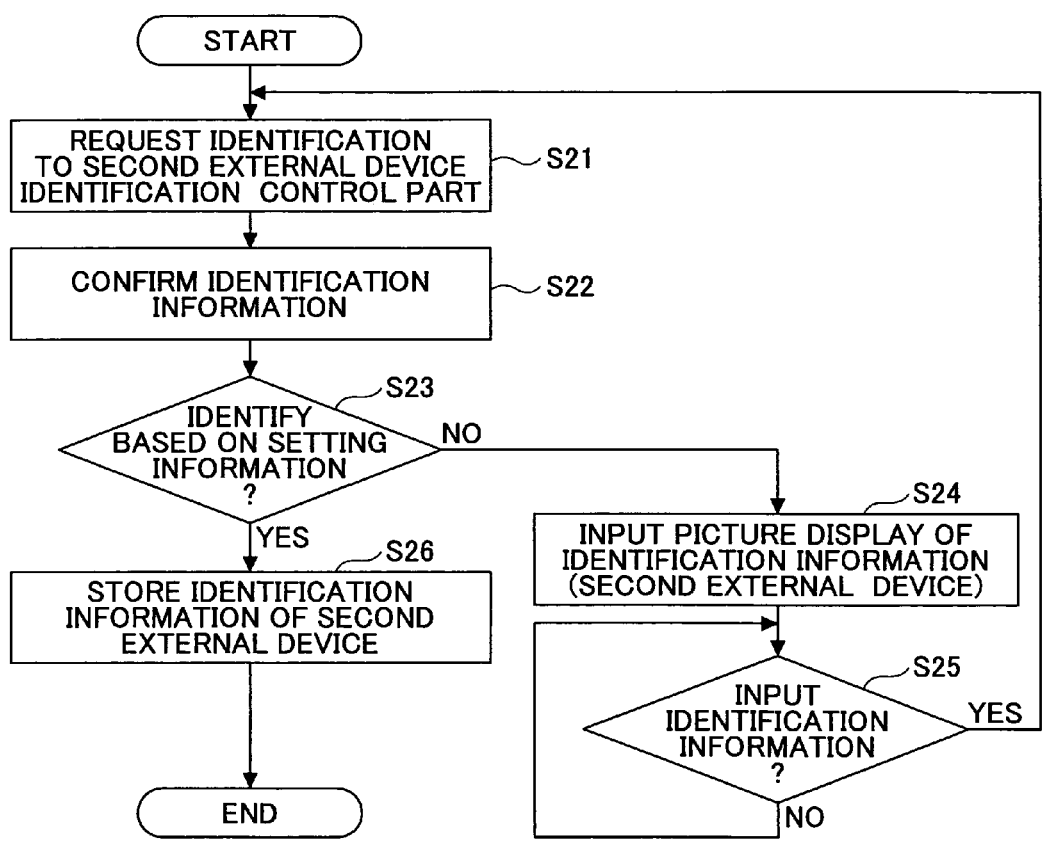
FIG. 9 is a flowchart showing an operation of identifying action of a second external device after the first external device and the individual menu device are identified, of the embodiment of the present invention.

Meanwhile, FIG. 9 is a flowchart showing an operation of additional identifying action of the second external device after the first external device and the individual menu device are identified.

Referring to FIG. 9, at the same time as starting the individual menu or corresponding to the request for using the function of the second external device, the common identification control part 53h requests the identification of the second external device from the second external device identification control part 53g in step S21 so that the second external device identification control part 53g implements identification with a second external device identification part 52f. At this time, the common identification control part 53h confirms so as to obtain "SECOND EXTERNAL DEVICE IDENTIFICATION INFORMATION" of the item (6) of the individual setting table shown in FIG. 8 in step S22. This "SECOND EXTERNAL DEVICE IDENTIFICATION INFORMATION" of the item (6) of the individual setting table shown in FIG. 8 is the individual setting information 53m of the individual menu identified via the individual menu management part 53k. Here, the existence of registration of the identifying information or whether the information is the input identification information is confirmed.

In step S22, if the identification information is not registered at "SECOND EXTERNAL DEVICE IDENTIFICATION INFORMATION" of the item (6) of the individual setting table shown in FIG. 8, since the identifying process with the first external device is already completed, the identification information identified by the first external device is used. If the identification information is registered at "SECOND EXTERNAL DEVICE IDENTIFICATION INFORMATION" of the item (6) of the individual setting table shown in FIG. 8, the identification information is obtained and the second external device identification control part 53g implements identification with the second external device identification part 52f in step S23. If this identification is successful (YES in step S23), the individual menu function implementing part 53i can use the function of a second external device function implementing part 52e.

If this identification is not successful (NO in step S23), the common identification control part 53h displays an input dialog on the display input control part 53d again in step S24. This is displayed on a picture as the function of the second external device function implementing part 52e from the individual menu function implementing part 53i. Implementation of the function of the individual menu function implementing part 53i or the first external device function implementing part 51a is not obstructed.

If the user inputs correct identification information to the input dialog (display picture in step S13) (YES in step S25) the common identification control part 53h requests the second external device identification control part 53g to implement the identification with the second external device identification part 52f again in step S21. If the input identification information is confirmed in step S22 and determination of the identification based on this identification information is successful (YES in step S23), the common identification control part 53h stores, via the individual menu management part 53k, correct identification information in "SECOND EXTERNAL DEVICE IDENTIFICATION INFORMATION" of the item (6) of the individual setting information 53m shown in FIG. 8 in step S26. This correct identification information is used next time when the second external device identification control part 53g implements the identification with the second external device identification part 52f.

As a result of this, in a case where "SECOND EXTERNAL DEVICE IDENTIFICATION INFORMATION" of the item (6) of the individual setting table shown in FIG. 8 is not registered, the identification flow fails only the first time. However, in the identification flow after the second time, the stored information can be used. If the first external device is designated as the subject of the priority identification, the identification flow is completed by only the first external device and the individual menu device. The second external device implements the identification when the function of the second external device function implementing part 52e is used in the individual menu. Because of this, if the user registration of the first external device is identical with user registration of the individual menu, the identification flow is successful. The second external device may identify when the function is required.

By the identification action discussed above, it is possible to use functions of various devices connected to the network and the digital color multifunction processing machine 1.

In the digital color multifunction processing machine 1 shown in FIG. 3, there are processes for "paper document", "media document" and "storing document". As discussed regarding the OCR function, for example, in a case where the document of the user read by the image reading device 8 is sent by the facsimile as the process of the "paper document", it is possible to implement the OCR process of the recognized image so as to use a character line recognized in the manuscript as an OCR address. In addition, in a case where the document is stored for using it as material, the OCR process is implemented so that a full text search can be applied to this manuscript.

In the conventional art, in order to provide a password for preventing alternation to a document file as security protection, it is necessary to read the corresponding document file using the computer so as to provide the password. However, in the digital color multifunction processing machine 1 shown in FIG. 3, it is possible to provide the password for the document file with the security function of the protection part so that the security protection can be performed by the one touch function.

According to this function, based on setting for processing the document file that is set in advance, a process that is set as the security protection can be implemented. For example, the paper document is sent to the image reading device and a key where a one-touch function is set is pressed, so that the paper document is read in a selected resolution and converted to a PDF file. A function whereby printing is not permitted is set in this file and the password is provided for this file so as to be sent.

In a case of the PDF file, there are a password for opening and an authority password as passwords that are provided for this file. Limitations of functions for handling the document such as open, print or edit of the PDF file where these passwords are provided can be implemented so that the security protection can be provided.

If the identification by the password for opening that is set for the PDF file is not made, the PDF file cannot be opened and seen. Similarly, if the identification by the authority password is not made, setting of permission or non-permission of printing or editing cannot be changed. Because of this, in a case where printing or editing of the PDF file is not permitted, if the authority password is not known, printing or editing cannot be done.

In the one touch function, providing the password for the PDF file or not, selection of authority of permitting or not permitting printing or editing, an effective term, an effective URL, and others can be set (See FIG. 10).

In the one touch function, in a case where the authority password is set and setting input of the password is blank, the password is randomly and automatically generated inside of the device so as to be provided. At this time, if printing and editing are set to be not permitted, the file can be converted to a PDF file where the password is automatically generated so that nobody can print or edit it.

In addition, in the digital color multifunction processing machine 1 shown in FIG. 3, when the document file that is input such as a paper manuscript, a media document, a storing document, and a received facsimile document, is stored, the OCR process is implemented. At the time of this storing process, the file is converted to a PDF file so that a process for providing the security protection may be implemented.

Thus, the document file can be converted under conditions that are set in advance; the limitations of functions, such as printing, editing, and handling the document file can be set; and the document file where the password for changing the limitation setting is provided can be output.

When a document desirable for the user is sent by the facsimile in the digital color multifunction processing machine 1, while the address can be directly input other than selection of the address book registered in advance, the same address as the address directly input by the confirmation part is required to be input twice. By the confirmation based on these two inputs, an input error can be prevented.

Figure 11:
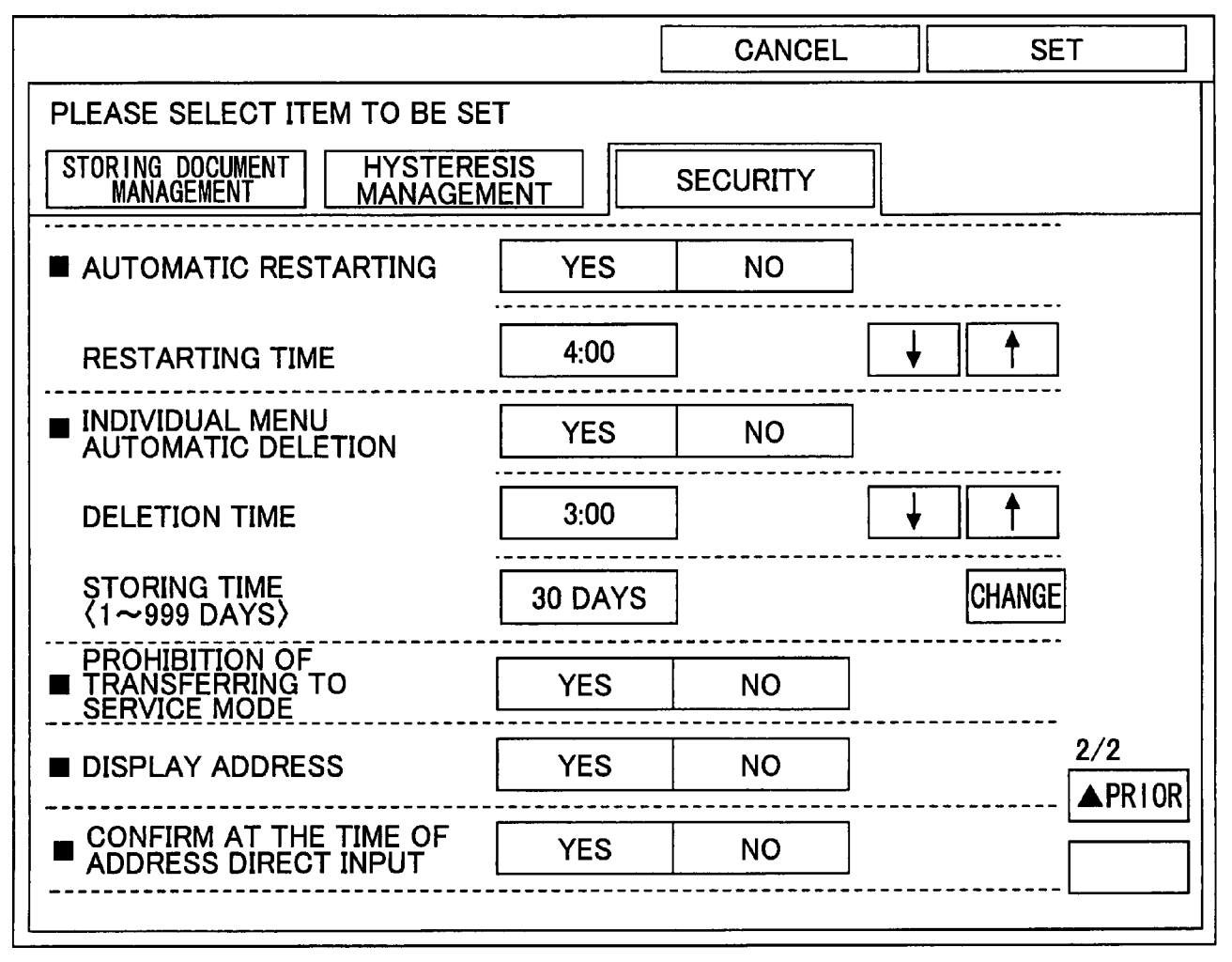
Figure 12:
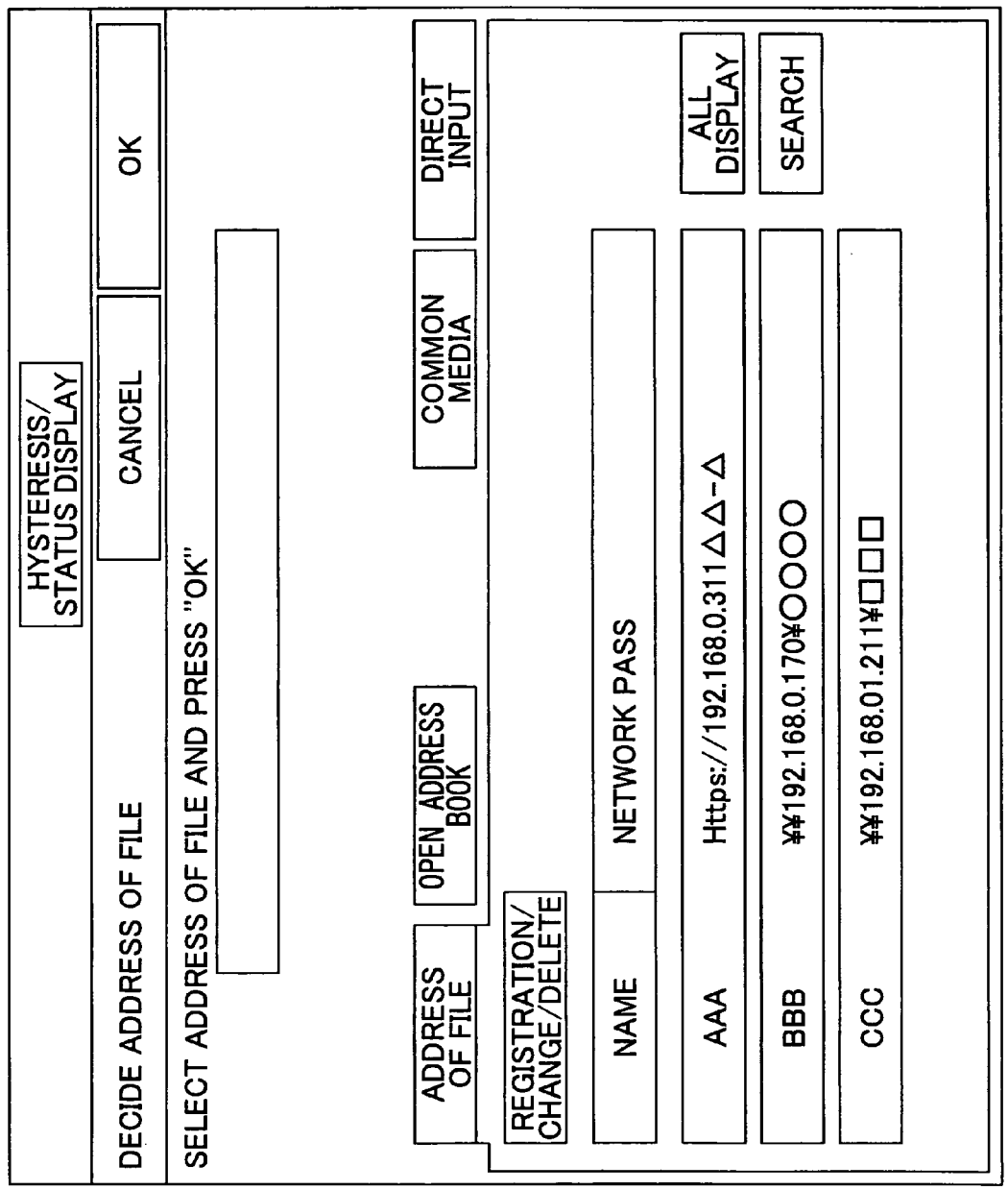
FIG. 12 is a view of a file address selection screen displayed on the displaying device.
Figure 13:
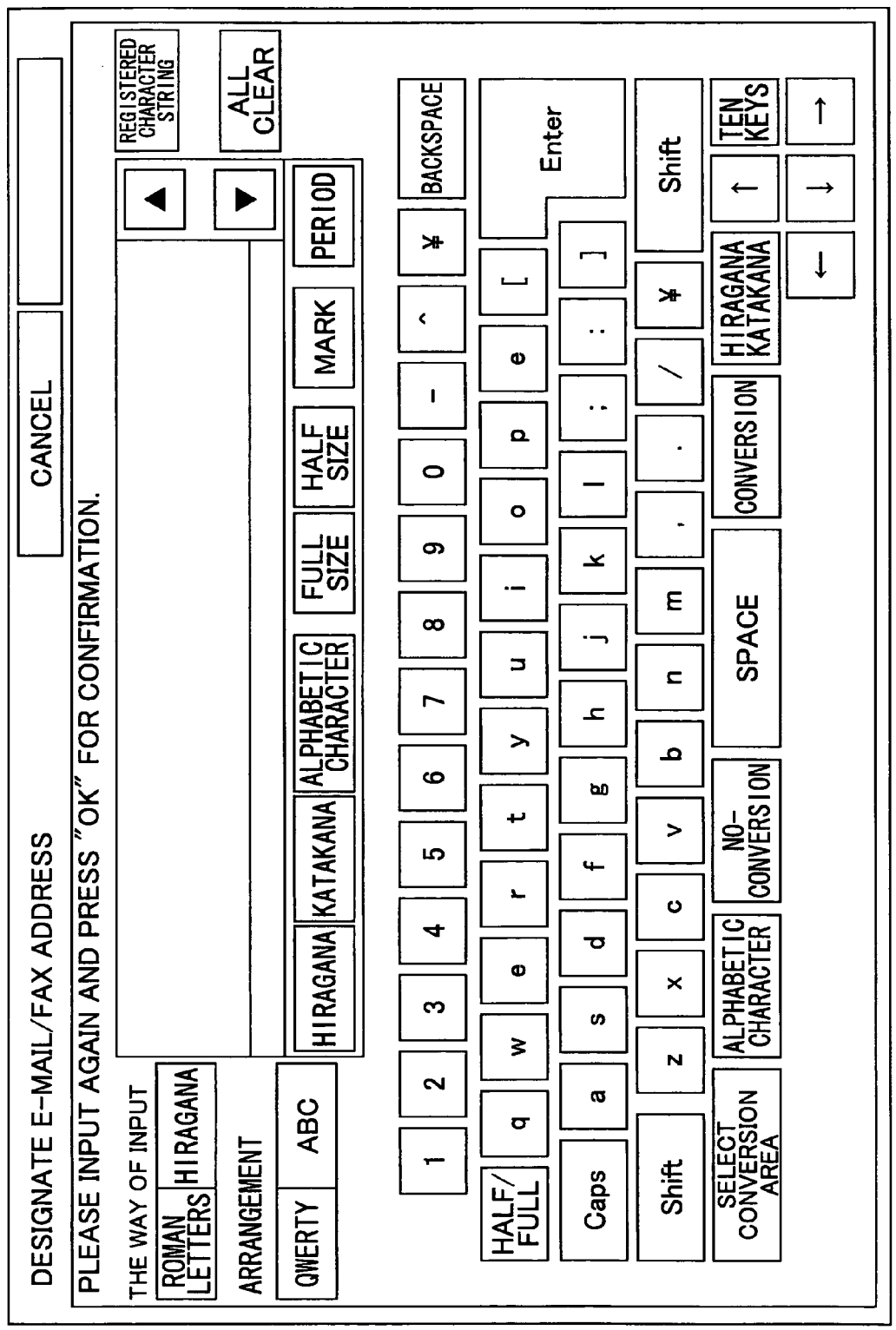
FIG. 13 is a view of a soft keyboard display screen displayed on the displaying device.

By setting "CONFIRM AT THE TIME OF ADDRESS DIRECT INPUT" in the screen for manager setting shown in FIG. 11, the two inputs are encouraged. In addition, in a case where the address is directly input, by pressing "DIRECT INPUT" in the file address selection screen shown in FIG. 12, a soft keyboard shown in FIG. 13 is displayed so that the address can be input.

Figure 14:
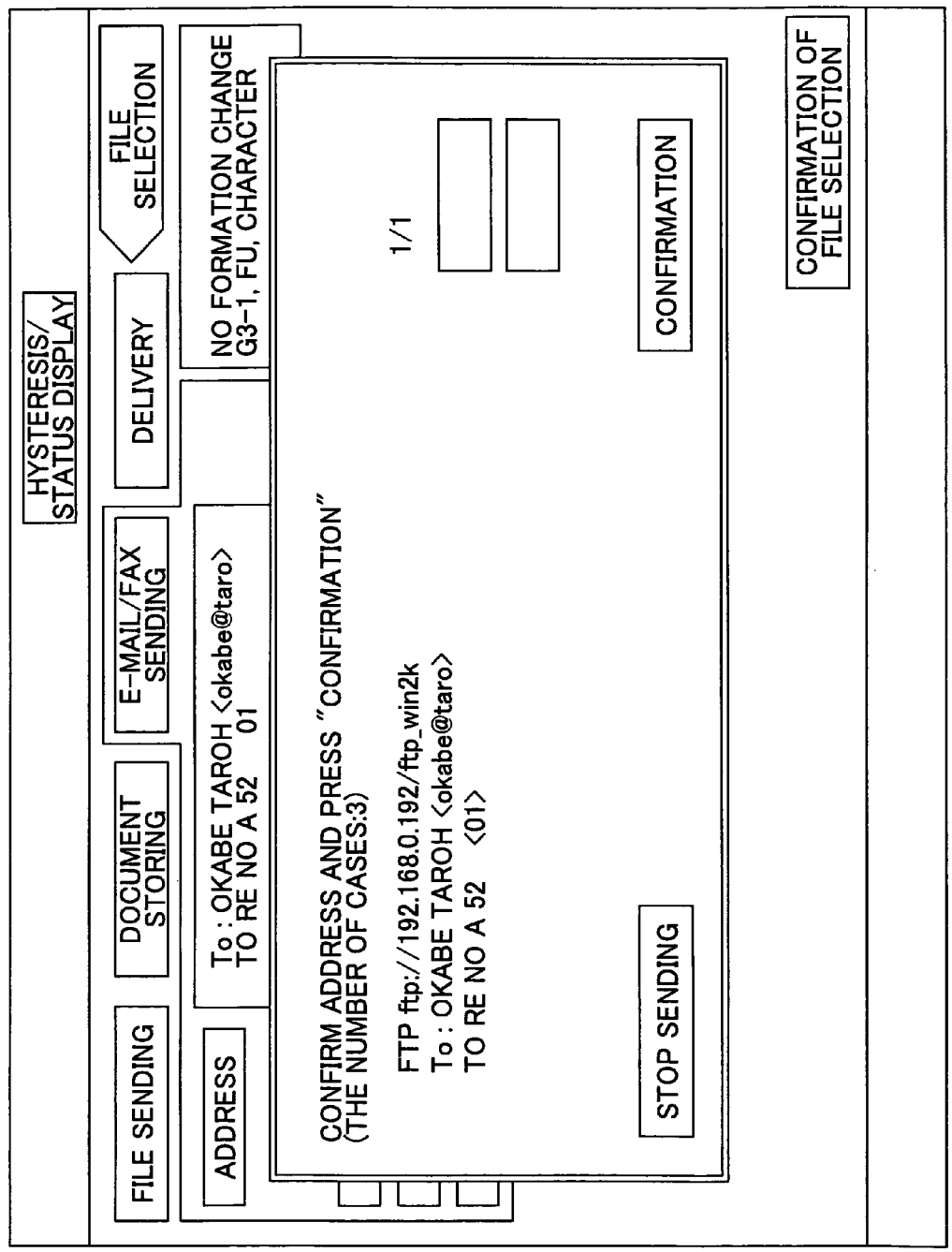
FIG. 14 is a view of a sending confirmation dialog (before confirmation) displayed on the displaying device.
Figure 15:
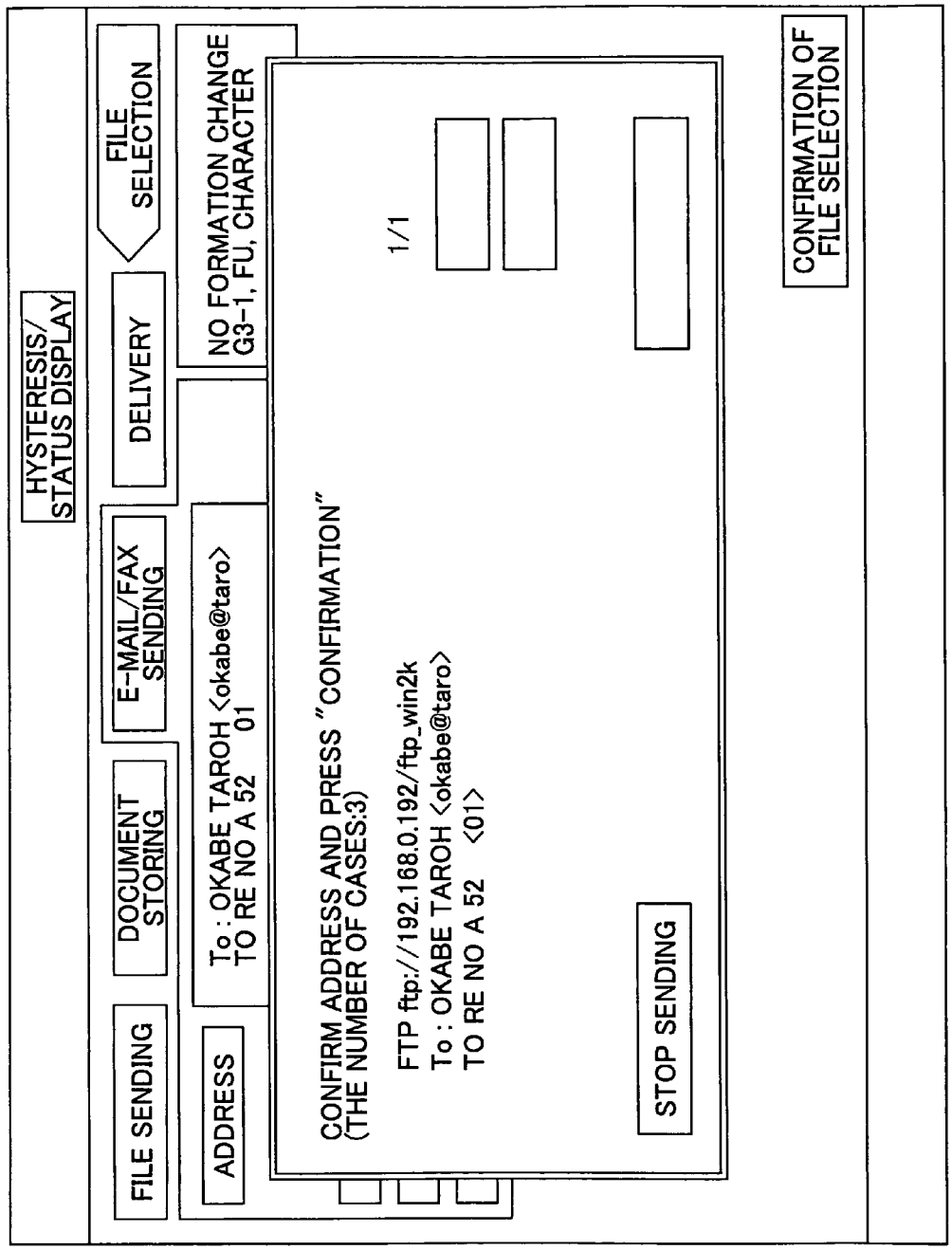
FIG. 15 is a view of a sending confirmation dialog (after confirmation) displayed on the displaying device.

At a "START" key arranged at the operations panel P (see FIG. 4) after the address is input, an LED provided on a key top is turned on as a green color indicating an input capable state. By pressing this, the LED of the "START" key is turned on from green color to red color so that the input cannot be done. After that, the sending confirmation dialog (shown in FIG. 14) is displayed in the displaying device so that the confirmation of the address is encouraged. In this screen, after the address is confirmed, "CONFIRMATION" on the screen is pressed so that the display of the "CONFIRMATION" disappears (See FIG. 15). In addition, green color is turned on at the LED of the "START" key again so that the "START" key can be pressed. By pressing this "START" key, sending is started so that address input is completed. Because of this, it is possible to prevent an operational error when the document is sent by the facsimile so that a precise process can be implemented.

As examples for limiting a function that the digital color multifunctional device 1 has due to the manager setting function of the control part, there are access limitations of a facsimile sending number, SMTP/POP (e-mail), and HTTP (Web page).

FIG. 16 is a view of a facsimile sending number limitation screen. The number that is set on this screen is confirmed from an upper part in order that setting of permit/not permit can be made for each number. For example, if a first one is "0: permit", all of "0" callings are possible. If a first one is "0120: permit" and a second one is "0 not permit", while "0120" calling is possible, next "0" calling, namely the number starting from "00" or "02" is not permitted. In addition, the same method can be applied to a receiving side.

Similarly, in a case of e-mail, on the SMTP/POP access limitation screen shown in FIG. 17, it is possible to set an opponent of sending e-mail and set permit/not permit for each of the opponents. As the opponent of sending e-mail, in addition to each e-mail address, the domain name of the e-mail address can be registered so that e-mail that is sent to an address having the same domain name can be limited. In addition, this can be set at a receiving side of e-mail. Furthermore, access to a home page of the domain name set by setting the IP address can be limited at a receiving side as the HTTP access limitation shown in FIG. 18.

"Yes/No" can be set in a lump (at the same time) for each of these limitations, such as SMTP/POP access limitation and HTTP access limitation. See FIG. 19.

The SMTP/POP access limitation or HTTP access limitation can be managed in a lump by the manager and further detailed limitations can be set by an individual in a range of limitations set by the manager.

However, in the above-discussed facsimile sending number limitation, an exceptional setting change can be done by the manager and the individual cannot set. For example, "0" calling is not permitted to all individual but permitted to a specific individual.

Thus, an opponent of sending or receiving can be limited by the limitation part so that the document that is input or output via the device can be managed and protected.

Figure 20:
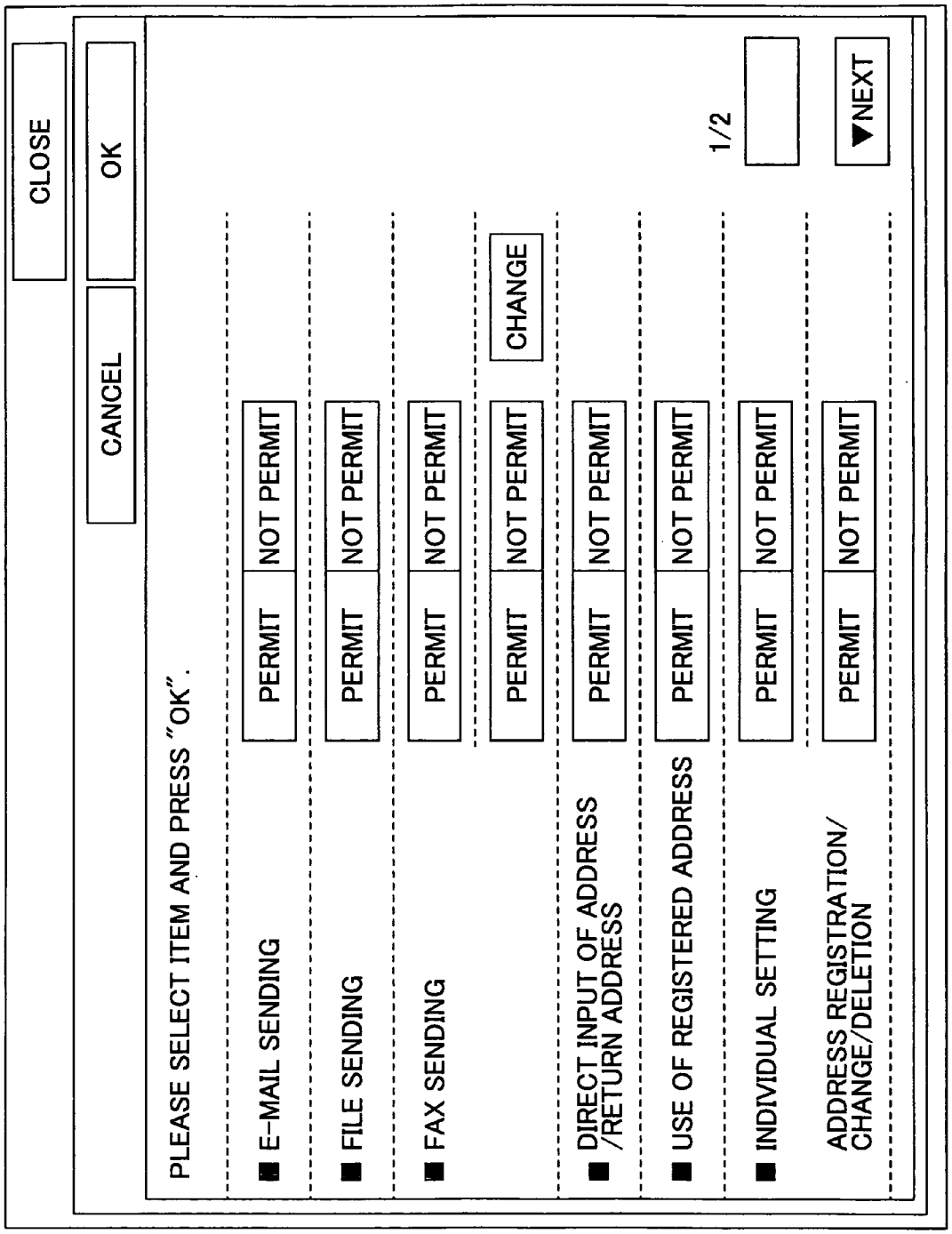
FIG. 20 is a view of a function limitation setting first screen displayed on the displaying device.
Figure 21:
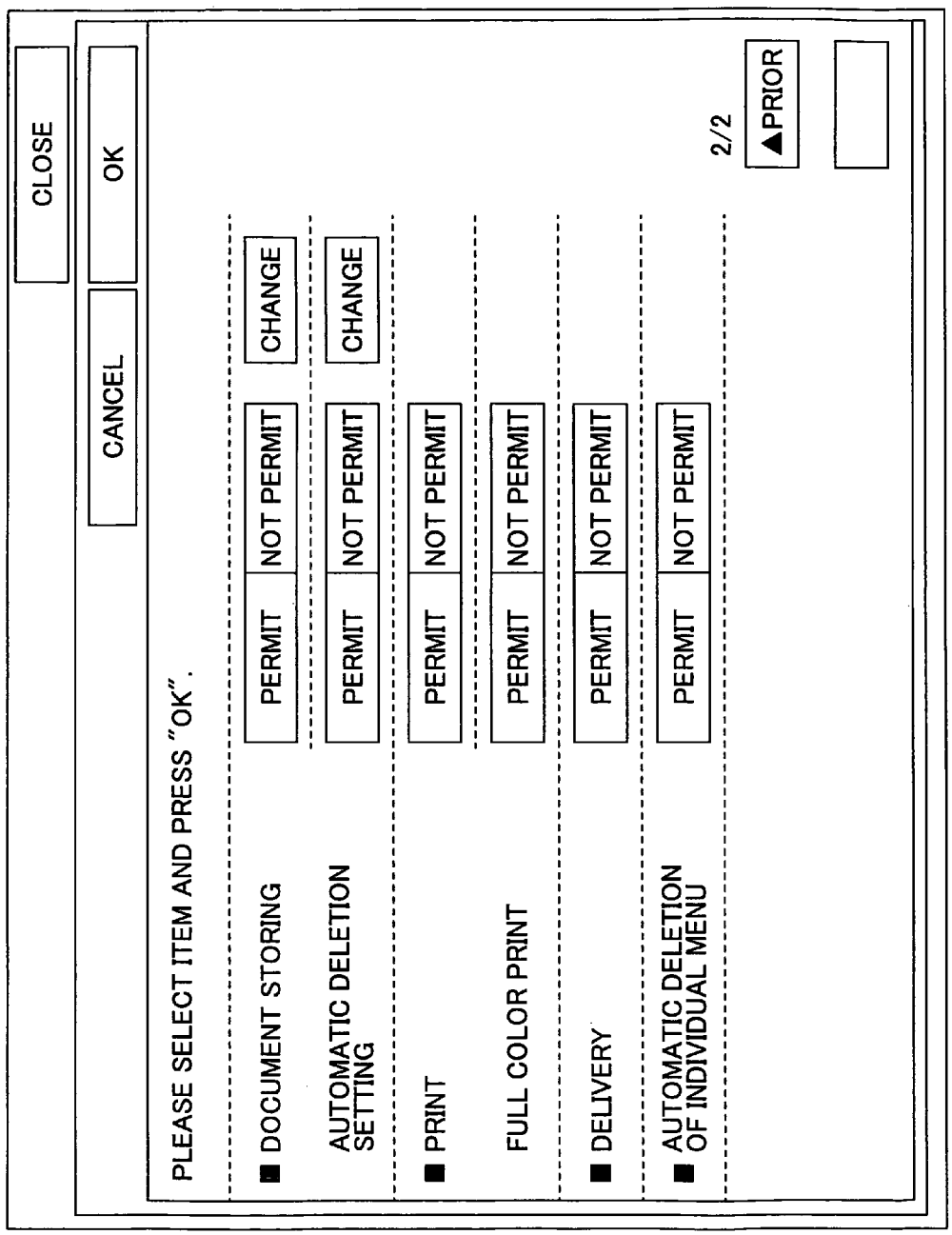
FIG. 21 is a view of a function limitation setting second screen displayed on the displaying device.

FIG. 20 and FIG. 21 show examples of function limitation at the individual menu that is set by the manager. If "DIRECT INPUT OF ADDRESS/RETURN ADDRESS PERMIT/NOT PERMIT" is "PERMIT", twice input that is discussed above becomes effective. In addition, if "DIRECT INPUT OF ADDRESS/RETURN ADDRESS PERMIT/NOT PERMIT" is "NOT PERMIT", the address registered by the individual cannot be used and only the address registered as the guest user under the management of the manager can be used. If "INDIVIDUAL SETTING PERMIT/NOT PERMIT" is "NOT PERMIT", the individual cannot change the setting. If "INDIVIDUAL SETTING PERMIT/NOT PERMIT" is "PERMIT" and "ADDRESS REGISTRATION/CHANGE/DELETION PERMIT/NOT PERMIT" is "NOT PERMIT", only the address cannot be changed. In addition, setting of "AUTOMATIC DELETION SETTING PERMIT/NOT PERMIT" of the "DOCUMENT STORING" of FIG. 21 is made so that the number of days of an initial value for deleting the stored document is not changed or not deleted. Such a limitation of an individual menu can be set.

According to the above-mentioned document input and output devices having security protection functions, the document that is input can be converted to a document where a limitation to a function for handling the document is set by a protection part, an operation error when the document is sent by the facsimile or the like can be prevented by a confirmation part, and an address of the document that is input or output via the device can be limited by a control part, so that the document can be managed and protected. The document input and output device is connected to the network, uses the communication protocol, and communicates the documents in various data forms with plural information devices.

According to the above-discussed embodiment of the present invention, it is possible to provide a document input and output device with a security protection function, the document input and output device being connected to a network and using a plurality of communication protocols, the document input and output device communicating documents in various data forms with plural information devices, including: a protection part configured to provide security protection for the document that is input; a confirmation part configured to encourage reconfirmation of information that is input by a user; and a restriction part configured to limit use of functions of the document input and output device; wherein the document is protected and a document input and output process is performed.

The protection part may set a limitation to a function for handling the document as the security protection; and the protection part may provide a password for authenticating permission for a setting change of the limitation to the document. The protection part may provide a password for the document as the security protection, corresponding to input of a specific key that is set, so as to implement a process for converting the document to a document wherein functions are limited. The password provided for the document may be randomly generated corresponding to setting of security. The confirmation part may require re-input after address information that is directly input is input. After a key operation of a last input screen, the confirmation part may display a confirmation screen for encouraging the confirmation and then returns to a screen before the key operation. After the confirmation part displays a confirmation screen for encouraging the confirmation, the confirmation screen may be finished by a key input in a different position. The restriction part may limit a sender of facsimile. The restriction part may limit e-mail and a Web page. The restriction part may limit use of the functions of the document input and output device for every individual.

It is also possible to provide a document input and output device with a security protection function, the document input and output device being connected to a network and using a plurality of communication protocols, the document input and output device communicating documents in various data forms with plural information devices, including protection means configured to provide security protection for the document that is input; confirmation means configured to encourage reconfirmation of information that is input by a user; and restriction means configured to limit use of functions of the document input and output device; wherein the document is protected and a document input and output process is performed.

The protection means may set a limitation to a function for handling the document as the security protection; and the protection means may provide a password for authenticating permission for a setting change of the limitation to the document. The protection means may provide a password for the document as the security protection, corresponding to input of a specific key that is set, so as to implement a process for converting the document to a document wherein functions are limited. The password provided for the document may be randomly generated corresponding to a setting of security. The confirmation means may require re-input after address information that is directly input is input. After a key operation of a last input screen, the confirmation means may display a confirmation screen for encouraging the confirmation and then returns to a screen before the key operation. The restriction means may limit a sender of facsimile. The restriction means may limit e-mail and a Web page. The restriction means may limit use of the functions of the document input and output device for every individual.

It is also possible to provide a document input and output method of a document input and output device with a security protection function, the document input and output device being connected to a network and using a plurality of communication protocols, the document input and output device communicating documents in various data forms with plural information devices, the method including: a protection step of providing security protection for the document that is input; a confirmation step for encouraging reconfirmation of information that is input by a user; and a restriction step for limiting use of functions of the document input and output device; wherein the document is protected and a document input and output process is performed.

The present invention is not limited to these embodiments, but variations and modifications may be made without departing from the scope of the present invention.

This patent application is based on Japanese Priority Patent Application No. 2005-251320 filed on Aug. 31, 2005, the entire contents of which are hereby incorporated by reference.

What is claimed is:

1. A document input and output device with a security protection function, the document input and output device being connected to a network and using a plurality of communication protocols, the document input and output device communicating documents in various data forms with plural information devices, comprising:
   a setting part configured to set a security protection setting;
   a protection part configured to provide security protection for a document that is input, the protection part being configured to convert the document into a document having limited functions based on the security protection setting; and
   a confirmation part configured to request confirmation of information that is input by a user,
   wherein the document is protected and a document input and output process is performed to convert the input document into the converted document, and the converted document is protected,
   wherein the confirmation part requires address information that is directly input to be input again, and
   wherein in the case of directly inputting an address of a destination where the document is to be transmitted, a screen for requesting a user to input the address again for confirmation is displayed to the user based on the security transmission setting, and wherein the screen for requesting the user to input the address again for confirmation is displayed in succession to a display of the screen where the address is directly input in the case of directly inputting the address.

2. The document input and output device as claimed in claim 1, wherein the protection part sets a limitation to a function for handling the document as the security protection; and the protection part provides a password for authenticating permission for a setting change of the limitation to the document.

3. The document input and output device as claimed in claim 2, wherein the protection part provides the password for the document as the security protection, corresponding to input of a specific key that is set.

4. The document input and output device as claimed in claim 2, wherein the password provided for the document is randomly generated corresponding to setting of security.

5. The document input and output device as claimed in claim 1, wherein, after a key operation of a last input screen, the confirmation part displays a confirmation screen for requesting confirmation and then returns to a screen before the key operation.

6. The document input and output device as claimed in claim 1, wherein, after the confirmation part displays a confirmation screen for encouraging the confirmation, the confirmation screen is finished by a key input in a different position.

7. The document input and output device as claimed in claim 1, further comprising:

a restriction part configured to limit use of functions of the document input and output device, wherein the restriction part limits a function of sending a facsimile of the protected document with respect to one or more sender.

8. The document input and output device as claimed in claim 7, wherein the restriction part limits e-mail and Web page functions associated with the protected document.

9. The document input and output device as claimed in claim 7, wherein the restriction part limits use of the functions of the document input and output device for every individual.

10. A document input and output device with a security protection function, the document input and output device being connected to a network and using a plurality of communication protocols, the document input and output device communicating documents in various data forms with plural information devices, comprising:

setting means configured to set a security protection setting;

protection means configured to provide security protection for the document that is input, the protection means being configured to convert the document into a document having limited functions based on the security protection setting; and confirmation means configured to request confirmation of information that is input by a user, wherein the confirmation means requires address information that is directly input to be input again, wherein a document input and output process is performed to convert the input document into the converted document, and the converted document is protected, wherein in the case of directly inputting an address of a destination where the document is to be transmitted, a screen for requesting a user to input the address again for confirmation is displayed to the user based on the security transmission setting, and wherein the screen for requesting the user to input the address again for confirmation is displayed in succession to a display of the screen where the address is directly input in the case of directly inputting the address.

11. The document input and output device as claimed in claim 10, wherein the protection means sets a limitation to a function for handling the document as the security protection; and the protection means provides a password for authenticating permission for a setting change of the limitation to the document.

12. The document input and output device as claimed in claim 11, wherein the protection means provides the password for the document as the security protection, corresponding to input of a specific key that is set.

13. The document input and output device as claimed in claim 11, wherein the password provided for the document is randomly generated corresponding to a setting of security.

14. The document input and output device as claimed in claim 10, wherein, after a key operation of a last input screen, the confirmation means displays a confirmation screen for requesting confirmation and then returns to a screen before the key operation.

15. The document input and output device as claimed in claim 10, further comprising:

restriction means configured to limit use of functions of the document input and output device, wherein the restriction means limits a function of sending a facsimile of the protected document with respect to one or more senders.

16. The document input and output device as claimed in claim 15, wherein the restriction means limits e-mail and Web page functions associated with the protected document.

17. The document input and output device as claimed in claim 15, wherein the restriction means limits use of the functions of the document input and output device for every individual.

18. A document input and output method of a document input and output device with a security protection function, the document input and output device being connected to a network and using a plurality of communication protocols, the document input and output device communicating documents in various data forms with plural information devices, the method comprising:

setting a security protection setting;

providing security protection for the document that is input, including converting the document into a document having limited functions using the document input and output device based on the security protection setting;

requesting confirmation of information that is input by a user, wherein a document input and output process is performed to convert the input document into the converted document, and the converted document is protected, wherein the requesting confirmation requires address information that is directly input to be input again, wherein if an address of a destination where the document is to be transmitted is directly inputting, a screen for requesting a user to input the address again for confirmation is displayed to the user based on the security protection setting, and wherein the screen for requesting the user to input the address again for confirmation is displayed in succession to a display of the screen where the address is directly input in the case of directly inputting the address.

* * * * *